United States Patent
Yasuda

(10) Patent No.: US 6,570,298 B2
(45) Date of Patent: May 27, 2003

(54) VIBRATION CONTROL DEVICE AND DRIVING METHOD THEREOF

(75) Inventor: Masashi Yasuda, Amagasaki (JP)

(73) Assignee: Tokkyokiki Co., Ltd., Amagasaki (JP)

( * ) Notice: Subject to any disclaimer, the term of this patent is extended or adjusted under 35 U.S.C. 154(b) by 85 days.

(21) Appl. No.: 09/851,897

(22) Filed: May 9, 2001

(65) Prior Publication Data

US 2002/0014814 A1 Feb. 7, 2002

(30) Foreign Application Priority Data

| May 9, 2000 | (JP) | ............................... 2000-142233 |
| Jul. 25, 2000 | (JP) | ............................... 2000-223551 |
| Jul. 25, 2000 | (JP) | ............................... 2000-223552 |

(51) Int. Cl.[7] ......................... H01L 41/04; H01L 41/08; H01L 29/82; H02N 2/00; H02K 33/00
(52) U.S. Cl. ....................... 310/328; 257/420; 257/415; 248/550; 318/114
(58) Field of Search ........................ 310/328; 257/415, 257/420; 248/550

(56) References Cited

U.S. PATENT DOCUMENTS

| 4,632,311 A | * | 12/1986 | Nakane et al. ............... 239/101 |
| 4,736,131 A | * | 4/1988 | Fujimoto ..................... 310/328 |
| 4,803,393 A | * | 2/1989 | Takahashi ................... 310/328 |
| 4,976,553 A | * | 12/1990 | Yamaguchi et al. ... 400/124.16 |
| 5,029,677 A | * | 7/1991 | Mitsui ....................... 188/267.1 |
| 5,052,510 A | * | 10/1991 | Gossman .................... 180/300 |
| 5,055,733 A | * | 10/1991 | Eylman ....................... 310/328 |
| 5,063,542 A | * | 11/1991 | Petermann et al. .......... 367/166 |
| 5,083,756 A | * | 1/1992 | Tobias ........................ 267/136 |
| 5,191,252 A | * | 3/1993 | Sano .......................... 310/328 |
| 5,286,199 A | * | 2/1994 | Kipke ......................... 434/114 |
| 5,329,201 A | * | 7/1994 | Shirasaki ............... 310/323.11 |
| 5,376,860 A | * | 12/1994 | Sato ........................... 310/346 |
| 5,406,153 A | * | 4/1995 | Flatau et al. .................. 310/26 |
| 5,481,152 A | * | 1/1996 | Buschulte ................... 310/328 |
| 5,610,643 A | * | 3/1997 | Kutami et al. ................ 347/54 |
| 5,660,255 A | | 8/1997 | Schubert et al. ............ 188/378 |
| 5,826,683 A | * | 10/1998 | Murata et al. .............. 188/161 |
| 6,034,466 A | * | 3/2000 | Blanding et al. ............ 310/328 |
| 6,132,035 A | * | 10/2000 | Kutami et al. ................ 347/70 |
| 6,194,812 B1 | * | 2/2001 | Klugl et al. ................ 310/328 |
| 6,296,196 B1 | * | 10/2001 | Denen et al. .................. 239/4 |

FOREIGN PATENT DOCUMENTS

| JP | 07301354 A | * | 11/1995 | ........... F16K/31/02 |
| JP | 2001317585 A | * | 11/2001 | ........... F16F/15/02 |
| JP | 2002035696 A | * | 2/2002 | ........... B06B/03/00 |
| JP | 2002039261 A | * | 2/2002 | ........... F16F/15/02 |

* cited by examiner

Primary Examiner—Nestor Ramirez
Assistant Examiner—J. Aguirrechea
(74) Attorney, Agent, or Firm—Rosenthal & Osha L.L.P.

(57) ABSTRACT

A vibration control device 1 in accordance with the present invention is provided with a liquid lever mechanism 4 which has an action member 5, a liquid chamber 6 and a driving plate 7, and is used for enlarging a displacement, a piezo-actuator 2 which can be displaced in a direction so as to change the volume of the liquid chamber 6, and a rubber vibration isolator 3 which is placed between the liquid lever mechanism 4 and the piezo-actuator 2 in series therewith. This vibration control device 1 has a low natural frequency so that it has a superior passive vibration-blocking performance at high-frequency bands, while maintaining a superior active vibration-blocking performance at low-frequency bands, and also makes it possible to achieve a small size.

24 Claims, 29 Drawing Sheets

VIBRATION CONTROL DEVICE AND DRIVING METHOD THEREOF

TECHNICAL FIELD OF THE INVENTION

The present invention relates to a vibration control device having a solid-state actuator and its driving method, which can be used in an active vibration-eliminating device for actively eliminating environmental vibration of a floor, etc. from precision equipment and a microvibration applying device for carrying out a simulating operation on a microvibration environment and for measuring the microvibration sensitivity of a device.

BACKGROUND OF THE INVENTION

In recent years, solid-state actuators, such as piezo-elements and magnetostrictive elements, have been used in various fields, such as vibration controlling operations for vibration protection and vibration elimination and vibration generating operations. However, these solid-state actuators have a relatively small displacement when used independently, with the result that in most cases, they fail to achieve a desired object. For this reason, the application of a vibration control device in which a displacement enlarging mechanism using a large-diameter piston and a small-diameter piston with a gap filled with liquid and a solid-state actuator are combined has been proposed (for example, see Japanese Unexamined Patent Publication No. 301354/1995 (Hei 7-301354)). Such a vibration control device using combined displacement enlarging mechanism and solid-state actuator makes it possible to enlarge the displacement of the solid-state actuator in accordance with the ratio of areas of the large-diameter piston and the small-diameter piston, and consequently to obtain the corresponding output from the small-diameter piston side.

The above-mentioned vibration control device having the displacement enlarging mechanism and the solid-state actuator is superior in the vibration-blocking performance (active vibration blocking performance) in low frequency bands at the time when an active controlling operation is carried out while the solid-state actuator is being driven. However, since the active controlling operation potentially possesses the possibility of generating vibration, it is difficult to apply the active controlling operation to vibration control at high frequency bands. Therefore, at high frequency bands, it is preferable to carry out the vibration controlling operation by effectively utilizing a natural vibration-blocking characteristic (passive vibration-blocking characteristic) that the vibration control device itself possesses. However, the above-mentioned vibration control device having the displacement enlarging mechanism and the solid-state actuator has a comparatively high natural frequency, and fails to provide a sufficient passive vibration-blocking characteristic at high frequency bands. Moreover, there have been ever-increasing demands for small-size vibration control devices having solid-state actuators.

Here, the above-mentioned vibration control device having the displacement enlarging mechanism and the solid-state actuator fails to generate a great output displacement since the displacement of the solid-state actuator is small and since it is difficult to provide a great difference in the areas of the large-diameter piston and the small-diameter piston. For this reason, the above-mentioned vibration control device cannot be applied to operations, such as position control and attitude control, in which, in particular, a greater displacement is required. Moreover, in the above-mentioned vibration control device, in the case when a control target member is comparatively soft (in particular, when the rigidity of the supporting system supporting the actuator and the control target member is not sufficient), it is sometimes difficult to carry out an appropriate controlling operation on the control target member since the displacement is absorbed by the deformation of the control target member.

Moreover, the above-mentioned Japanese Unexamined Patent Publication No. 301354/1995 (Hei 7-301354)) does not clearly describe about a means for carrying out the vibration controlling operation with multiple-dimensional, multiple degrees of freedom in the vibration control device having the displacement enlarging mechanism and the solid-state actuator.

SUMMARY OF THE INVENTION

The main object of the present invention is to provide a vibration control device and a driving method suitable for such a device, which has a comparatively small size, and has a low natural frequency so that it exerts a superior passive vibration-blocking performance at high frequency bands, while maintaining a superior active vibration-blocking performance at low frequency bands.

Moreover, another object of the present invention is to provide a vibration control device and a driving method suitable for such a device, which can generate a comparatively great output displacement.

Still another object of the present invention is to provide a vibration control device and a driving method suitable for such a device, which has a low natural frequency so that it exerts a superior passive vibration-blocking performance at high frequency bands, while maintaining a superior active vibration-blocking performance at low frequency bands, and also carries out the vibration controlling operation with multiple-dimensional, multiple degrees of freedom.

In order to achieve one of the above-mentioned objects, a vibration control device in accordance with one aspect of the present invention is provided with: a displacement enlarging mechanism having first and second movable sections that are arranged so that a displacement inputted to the first movable section is enlarged and taken out from the second movable section; a solid-state actuator that is placed on a side opposite to the second movable section with respect to the first movable section, and is allowed to shift in a direction so as to move the first movable section of the displacement enlarging mechanism based upon an electric signal supplied thereto; and an inside elastic member that is placed between the second movable section and the solid-state actuator in series therewith.

In this vibration control device, a solid-state actuator is placed on the first movable section side of the displacement enlarging mechanism which enlarges the displacement inputted to the first movable section, and outputs the resulting displacement from the second movable section. The application of such a displacement enlarging mechanism makes it possible to enlarge the displacement of the solid-state actuator. For this reason, it is possible to provide a superior active vibration blocking performance in low frequency bands when, for example, a vibration controlling operation or a vibration-eliminating operation is carried out.

In a conventional active vibration-eliminating device using a solid-state actuator such as a piezo-electric element, an actuator having a multiple laminated layers of solid-state elements has been used so as to gain a longer stroke of the solid-state actuator. For example, in a solid-state actuator using piezo elements, piezo elements of d33-type are laminated as high as 10 cm so as to provide a displacement of approximately 70 ìm. In contrast, in the present invention, when a displacement enlarging mechanism having a displacement enlarging rate of 10 times is used, it is possible to easily obtain an amount of distortion of 150 ìm by using laminated piezo elements having a length of 20 mm. This makes it possible to cut costs greatly and consequently to devote greatly to the promotion of active vibration control devices.

Moreover, the application of the displacement enlarging mechanism makes it possible to easily obtain a greater displacement so that the vibration control device can also be applied to the positional control and attitude control, which have not been realized without using an air actuator. Furthermore, in the case when a control target member is comparatively soft (in particular, when the rigidity of the supporting system supporting the actuator and the control target member is not sufficient), a vibration control device without a displacement enlarging mechanism has failed to carry out an appropriate controlling operation on the control target member since the displacement is absorbed by the deformation of the control target member. However, the above-mentioned displacement as much as 150 ìm is a sufficient size for carrying out an appropriate controlling operation even in such a case. Therefore, the range of application of the vibration control device using solid-state actuators can be expanded greatly.

Moreover, in the vibration control device in accordance with the above-mentioned aspect of the present invention, in addition to the displacement enlarging mechanism and the solid-state actuator, an inside elastic member is placed in series therewith so that the natural frequency of the vibration control device is reduced as compared with conventional devices; therefore, it is possible to obtain a superior passive vibration-blocking performance in high frequency bands. For example, on the assumption that the natural frequency of a vibration control device having no inside elastic member has a natural frequency of 10 to 20 Hz, when the inside elastic member is added thereto, the natural frequency of the vibration control device can be reduced to approximately 1 to 10 Hz.

In other words, in the vibration control device of this type, a soft support system (that is, the natural frequency is small) is provided independent of the size of the displacement (stroke) of the inside elastic member, which is a preferable characteristic for the passive vibration-eliminating system. It is assumed that the arrangement in which the inside elastic member is series-placed with the solid-state actuator and the displacement enlarging mechanism has not been adopted because a loss is generated due to the deformation of the inside elastic member; however, when a vibration isolating system is taken into consideration, the above-mentioned advantages exceed this disadvantage. This makes it possible to provide a vibration control system which sufficiently utilizes a small capacity of the solid-actuator, which is a major characteristic of a solid-actuator. For example, assuming that the displacement enlarging rate of the displacement enlarging mechanism is 10 times, and that the elastic constant of the inside elastic member is K, the supporting elastic constant of the second movable section is 0.1 K; thus, it is possible to easily obtain an elastic constant of 1/10 of the inside elastic member. At this time, the controlling force of the solid-state actuator is reduced to 1/10, and taken out; however, in the case of microvibration, no problem arises even when the controlling force is small.

Moreover, one of the advantages of the application of a solid-state actuator is that an operation is available up to high frequency bands; and this characteristic is sufficiently exerted even in the arrangement like the vibration control device of the present embodiment, in which the inside elastic member is placed in series therewith. This is because the solid-state actuator is allowed to displace in proportion to the applied electric signal (current), and the application of an amplifier for supplying energy sufficiently up to high frequency bands makes it possible to obtain an output having a constant amplitude. On the assumption that this amplitude is x, in the case when the displacement enlarging rate of the displacement enlarging mechanism is 10 times and when the elastic constant of the inside elastic member is K, the action force outputted from the second movable section is 0.1 Kx, which indicates that a constant controlling force can be outputted up to high-frequency bands.

Moreover, in the vibration control device in accordance with the above-mentioned aspect of the present invention, since the inside elastic member is placed between the second movable section and the solid-state actuator in series therewith, an inside elastic member having a greater elastic coefficient with a smaller displacement (in other words, hard) can be used, as compared with a case in which the inside elastic member is placed on the side opposite to the first movable section with respect to the second movable section. For this reason, it is possible to reduce the volume of the inside elastic member, and consequently to miniaturize the vibration control device.

In the present invention, with respect to the inside elastic member, any known member, such as rubber and springs, may be used. More specifically, those members that are less susceptible to changes in the characteristics due to drifting and temperature changes (for example, a spring unit having a plurality of small coil springs aligned in parallel with each other, this unit molded by gel, a disc spring, etc.) may be preferably used.

Moreover, in the above-mentioned vibration control device, it is preferable to have an arrangement in which: the liquid displacement enlarging mechanism is provided with a liquid chamber in which liquid is sealed, the first movable section is allowed to contact the liquid inside the liquid chamber, and the second movable section is allowed to contact the liquid inside the liquid chamber with a contact area smaller than that of the first movable section. In other words, the liquid displacement enlarging mechanism is provided with the liquid chamber in which liquid is sealed, the first movable section, and the second movable section having a contact area to the liquid that is smaller than that of the first movable section, and a solid-state actuator is placed on the first movable section side (hereinafter, such a mechanism is referred to as "liquid lever mechanism" in the present specification).

In the liquid lever mechanism, a force transmission is made through liquid, and the resulting advantage is that the place and direction in which a force is exerted can be changed with high degree of freedom. This makes it possible to place the solid-state actuator in a place at which it is easily maintenanced, and the second movable section is placed in the vicinity of the control target member. Conventional devices have failed to realize this effect.

Moreover, in comparison with a mechanical displacement enlarging mechanism using, for example, a lever, the liquid lever mechanism has an advantage that it has hardly any high-order vibration modes in the degree of freedom in the non-rigidity internal structure.

With respect to the liquid inside the liquid chamber, it is preferable to use a non-volatile, stable liquid such as silicone oil; however, the present invention is not intended to be limited thereby. It is not necessary for the liquid itself to have a damping characteristic to vibration, and it is preferable to use a liquid having a high flowing characteristic with a small viscosity; that is, such a liquid exerts a superior rising property when controlled.

Moreover, a vibration control device in accordance with another aspect of the present invention is provided with: a displacement enlarging mechanism having a liquid chamber in which liquid is sealed and a number of small particles whose volume is elastically variable are dispersed, a first movable section that is allowed to contact the liquid inside the liquid chamber and a second movable section that is allowed to contact the liquid inside the liquid chamber with a contact area smaller than that of the first movable section; and a solid-state actuator which is placed on the side opposite to the second movable section with respect to the first movable section and which is displaced in a direction along which the first movable section of the displacement enlarging mechanism is shifted, based upon an electric signal supplied thereto.

Furthermore, a vibration control device in accordance with still another aspect of the present invention is provided with: a displacement enlarging mechanism having a gas chamber having a gas sealed therein, whose volume is elastically variable, a first movable section that is allowed to contact the gas inside the gas chamber, a second movable section that is allowed to contact the gas inside the liquid chamber with a contact area smaller than that of the first movable section; and a solid-state actuator which is placed on the side opposite to the second movable section with respect to the first movable section and which is displaced in a direction along which the first movable section of the displacement enlarging mechanism is shifted, based upon an electric signal supplied thereto.

In accordance with this vibration control device, the liquid lever mechanism (or the gas lever mechanism) makes it possible to enlarge the displacement of the solid-state actuator so that it provides a superior active vibration-blocking performance at low frequency bands, and also to reduce the natural frequency as compared with conventional devices so that it provides a superior passive vibration-blocking performance at high frequency bands. Moreover, a number of small particles whose volume is elastically variable are dispersed inside the liquid chamber (or the gas chamber whose volume is elastically variable is used) instead of the inside elastic member, and since these particles serve as the elastic member, it is not necessary to place another elastic member outside the liquid chamber (or the gas chamber), thereby making it possible to further miniaturize the vibration control device.

Moreover, the vibration control device of the present invention may be further provided with a mechanism for adjusting the pressure of the liquid chamber or the gas chamber. For example, a piston may be externally inserted into the liquid chamber so that the position of the second movable section is changed; and this means is convenient. In a conventional vibration control device having a solid-actuator, it is necessary to strictly carry out the positional adjustment on the solid-state actuator, and the adjustment in which a jack, etc. has to be used is comparatively difficult. In contrast, in the present invention, the adjustment of pressurization level to be applied to the solid-state actuator is easily carried out by changing the pressure inside the liquid chamber.

Moreover, in the vibration control device of the present invention, the peripheral portion of the first movable section may be sealed with the inside elastic member. It is important for the liquid lever to positively seal the first and second movable sections of the liquid chamber so as to prevent the liquid from leaking. By sealing the peripheral portion of the first movable section with the inside elastic member, it is possible to prevent leakage of the liquid with higher reliability, to reduce the number of parts and the number of manufacturing processes, and consequently to cut production costs.

Furthermore, in the vibration control device of the present invention, the inside elastic member may be placed inside the liquid chamber. With this arrangement, it is not necessary to place a separate inside elastic member outside the liquid chamber, and consequently to make the vibration control device more compact.

In the vibration control device of the present invention, the inside elastic member may be placed between the first movable section and the solid actuator. With this arrangement, since the inside elastic member is placed between the first movable section and the solid actuator, the inside elastic member is maintenanced more easily as compared with a case in which, for example, the inside elastic member is placed in the liquid chamber between the first movable section and the second movable section.

Moreover, in the vibration control device of the present invention, rigid members may be placed on both of the ends of the inside elastic member in the distortion direction. With this arrangement, since the rigid members are placed on both of the ends of the inside elastic member in the distortion direction, the displacement of the solid-state actuator locally placed may be transmitted to the displacement enlarging mechanism more efficiently.

In the vibration control device of the present invention, the displacement enlarging mechanism, the solid-state actuator and the inside elastic member may be assembled into one case. Thus, it is possible to further miniaturize the vibration control device.

The vibration control device of the present invention may be arranged so that the load applied to the solid-state actuator is controlled. Moreover, the vibration control device of the present invention may also be provided with an inside parallel elastic member placed in parallel with the solid actuator. With these arrangements, the load applied onto the solid actuator is controlled so that the solid actuator is optimally operated. In other words, when all the applied load is imposed on the solid actuator, the solid-state actuator is not operated at its operational best suited point. Therefore, in order to use each solid-state actuator at its best suited point, it is preferable to adjust the load, and the inside parallel elastic member is placed in parallel with the solid actuator so as to realize such an adjustment.

Moreover, in the vibration control device of the present invention, a coat member for coating the solid-state actuator may also be provided. Such a structure is realized by molding the solid-state actuator with an elastic material. Here, the solid-state actuator may be molded by the inside parallel elastic member so that it becomes possible to shield the solid-state actuator from influences of outside humidity, and consequently to ensure a long service life of the solid-state actuator.

In the vibration control device of the present invention, the peripheral portions of the first and second movable sections may be sealed with elastic members. It is important for the liquid lever mechanism and gas lever mechanism to positively seal the first and second movable sections of the liquid chamber or the gas chamber so as to prevent the liquid or gas from leaking. Since the vibration control device of the present invention is mainly used for controlling microvibration, the application of the elastic seal members makes it possible to prevent leakage of the liquid or gas with higher reliability. With respect to the elastic seal member, for example, an O-ring or X-ring may be used.

The vibration control device of the present invention may also be provided with a cushion elastic member placed on the side opposite to the first movable section with respect to the second movable section. With this arrangement, in the case when a shearing force is externally applied in a direction orthogonal to the shifting direction of the second movable section, the cushion elastic member functions as a cushion member (in other words, a member for releasing the shearing force) for the shearing force, thereby making it possible to prevent damages to the second movable section.

In the vibration control device of the present invention, the cushion elastic member may be placed in series with as well as in parallel with the second movable section. With this arrangement, it becomes possible to adjust the force imposed on the second movable section, and also to control the force applied to the solid-actuator. In other words, it is possible to reduce the load imposed on the second movable section, and consequently to allow the second movable section to share only the controlling force. The cushion elastic member, parallel-aligned in this manner, is allowed to distort only in the displacement direction of the second movable section, and consequently to generate an elastic force. Moreover, the control efficiency is allowed to increase as the vibration damping in the cushion elastic member parallel-aligned decreases.

Moreover, in the vibration control device of the present invention, the cushion elastic member may have a portion formed by alternately laminating at lease either of steel plates and resin plates, and elastomer. Such an elastic member formed by alternately laminating at lease either of steel plates and resin plates, and elastomer (hereinafter, referred to as "non-interference elastic member") functions desirably as a cushion member for the shearing force.

The vibration control device of the present invention may have an arrangement in which a plurality of the solid-state actuators are placed in parallel with each other. This arrangement makes it possible to generate a greater operational force.

Moreover, the vibration control device of the present invention may have an arrangement in which a plurality of the second movable sections are placed in parallel with each other with respect to the single displacement enlarging mechanism. With this arrangement, a plurality of the second movable sections can be simultaneously operated by using the single displacement enlarging mechanism, so that, for example, an object to be subjected to the operational force can be driven stably, or the operational force may be applied to two different objects simultaneously.

The vibration control device of the present invention may have an arrangement in which a plurality of the first movable sections and solid-state actuators are respectively placed on both of the ends of the displacement enlarging mechanism in a manner so as to face each other. With this arrangement, a portion of the operational force released outside is reduced, with the result that the operational force is transmitted to the second movable section at a higher rate. This arrangement is particularly effective, when applied to a vibration control device that is provided with the displacement enlarging mechanism having the liquid chamber having a number of small particles whose volume is elastically variable dispersed therein or the displacement enlarging mechanism having the gas chamber whose volume is elastically variable. Moreover, this arrangement allows a comparatively great number of piezo-actuators to be placed within a narrow flat area so that a greater operational force can be obtained.

Moreover, the vibration control device of the present invention may be further provided with a sensor for measuring the distance from a control target member placed on the side opposite to the first movable section with respect to the second movable section. With this arrangement, the position and orientation (that is, attitude) of the control target member can be controlled accurately by using the solid-state actuator.

Furthermore, in the vibration control device of the present invention, the solid-state actuator may include a piezo-element or the solid-state actuator may include a super-magnetostrictive element. In particular, the solid-state actuator including the super-magnetostrictive element is advantageous in that it provides a greater displacement and is less susceptible to damages.

With respect to a driving operation of the vibration control device, it is preferable to provide an arrangement in which: a vibration signal of a control target member is measured based upon the displacement of the second movable section, based upon the vibration signal, a driving signal is generated so as to allow the control target member to cause predetermined vibration (or to regulate the control target member from generating vibration), and the solid-state actuator is driven by the driving signal.

In this case, it is preferable to provide a controlling process in which: the relative displacement of the control target member is detected so that the relative positional error from the target position of the control target member is found, and an electric signal to be supplied to the solid-state actuator is controlled so as to allow the control target member to trace the target position. Such a driving method makes it possible to properly operate the device so as to allow the control target member to generate vibration or to regulate it from generating vibration. Moreover, a voltage supply may be cut off from any of the solid-state actuators that has been damaged, thereby making it possible to realize a driving operation with reduced power consumption. This arrangement may be achieved by incorporating a fusing mechanism in the controlling circuit of the solid-state actuator and disconnecting the corresponding fuse so as to cut off the power supply to the damaged solid state actuator.

Here, an explanation will be given of a specific application of the vibration control device of the present invention. In recent years, precision apparatuses tend to have degradation in their precision or a reduction in their productivity due to influences of microvibration caused by the installation environment; therefore, in order to prevent these influences, active vibration-eliminating devices having a solid-state actuator such as a piezo-element have been used. The active vibration-eliminating device actively controls floor vibration so as to reduce the vibration, and also has a reducing function with respect to vibration that the device itself generates. In general, the controlling operation of the active vibration-eliminating device is carried out with three-dimensional, six degrees of freedom, and a plurality of solid-state actuators, which are aligned in directions orthogonal to each other, have been used. With respect to actuators for active vibration-eliminating device that have been developed for this purpose, air pressure elements, linear motors, piezo-elements and super-magnetostrictive elements have been put into practical use. The present invention makes it possible to achieve high-performance active vibration-eliminating devices.

Moreover, microvibration applying bases which enable simulating operations for microvibration have been developed; and the vibration control device of the present invention, which enables both of the vibration-eliminating and vibration-generating operations within a wide frequency range, is best suited for the application to these microvibration applying bases. Moreover, active vibration-suppressing devices in which a mass body is allowed to vibrate and the reactive force is utilized for reducing vibration have been put into practical use; and the vibration control device is also best suited for this field.

Moreover, a vibration control device in accordance with another aspect of the present invention has an arrangement in which a plurality of the above-mentioned displacement enlarging mechanisms are installed.

With this arrangement, since a plurality of the displacement enlarging mechanisms are placed in series with each other so that a displacement in each displacement enlarging mechanism is enlarged to a multiple of the predetermined value; that is, a comparatively small displacement caused by one solid-state actuator is inputted to the first movable section at the initial stage so that a great displacement is outputted from the second movable section at the final stage of the displacement enlarging mechanism. Therefore, the vibration control device can be utilized for applications that require a particularly large displacement, such as a positional control operation and an attitude control operation. Furthermore, even in the case when a control target member is a comparatively soft member, it can provide a suitable controlling operation on even such a control target member. Thus, it becomes possible to greatly widen the scope of applications of the vibration control device using a solid-state actuator.

Moreover, the inside elastic member, placed in series therewith, makes it possible to reduce the natural frequency of the vibration control device as compared with conventional devices, and consequently to simultaneously obtain the above-mentioned advantage, that is, the superior passive vibration-blocking performance at high frequency bands.

Furthermore, in the case when the displacement of the solid-state actuator is enlarged by using, instead of the inside elastic member, the liquid lever mechanism (or the air lever mechanism having a gas chamber whose volume is elastically variable) in which a number of small particles whose volume is elastically variable are dispersed, it is not necessary to place another elastic member outside the liquid chamber (or the gas chamber); thus, it is possible to obtain a small-size vibration control device suitable for passive vibration-eliminating process.

Moreover, a vibration control device in accordance with still another aspect of the present invention is provided with a plurality of the displacement enlarging mechanisms respectively aligned in series with each other, each having the first and second movable sections, with a displacement inputted to the first movable section being enlarged and outputted from the second movable section, and a solid-state actuator that is placed on the side opposite to the rest of the first and second movable sections with respect to the first movable section located at the leading portion of the displacement enlarging mechanisms placed in series with each other, and that is displaced in a direction along which the first movable section located at the leading portion of the displacement enlarging mechanisms is moved, in accordance with an electric signal supplied thereto.

Moreover, in a vibration controlling structure of the present invention, a plurality of the vibration control devices are combinedly used for one or a plurality of members, with their operation directions, caused by displacements of the second movable sections, being aligned orthogonal to each other.

In this structure, a plurality of the vibration control devices are combinedly used for one or a plurality of members, with their operation directions, caused by displacements of the second movable sections, being aligned orthogonal to each other; therefore, it is possible to carry out a vibration controlling operation with multiple-dimensional, multiple-degrees of freedom. Moreover, the elastic members, placed in series therewith (or, instead of the inside elastic members, a number of small particles whose volume is elastically variable, dispersed in the liquid chamber, or a gas chamber whose volume is elastically variable), make it possible to reduce the natural frequency of the vibration control device as compared with conventional devices, and consequently to obtain a superior possible vibration-blocking performance at high-frequency bands. Here, in the present invention, "series" refers to a state in which an interaction of forces is carried out in series with each other, and it does not refer to a mechanical linear alignment.

Other features and advantages of the present invention will be apparent from the following description taken in connection with the accompanying drawings.

BRIEF DESCRIPTION OF DRAWINGS

Embodiments of the present invention will now be described by way of example with reference to the accompanying drawings in which.

DETAILED DESCRIPTION OF THE PREFERRED EMBODIMENTS

<First Embodiment>

Figure 1:
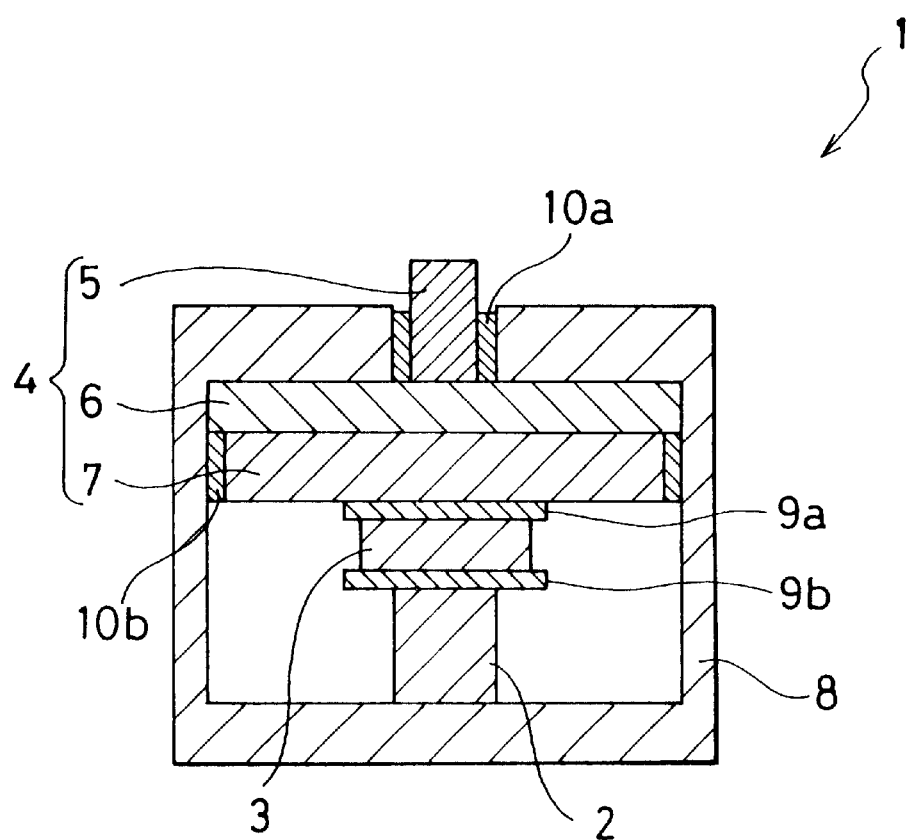
FIG. 1 is a cross-sectional view showing a vibration control device in accordance with a first embodiment of the present invention.

As illustrated in FIG. 1, a vibration control device 1 of the present embodiment is constituted by a piezo-actuator 2 containing a piezo-element, a rubber vibration isolator 3 which is an elastic member, a liquid lever mechanism 4 that is a displacement enlarging mechanism, which are placed inside a cylinder case 8 in series with one after another. The liquid lever mechanism 4 is constituted by a liquid chamber 6 in which liquid is sealed, a driving plate 7 that is placed between the liquid chamber 6 and the rubber vibration isolator 3 so as to contact the liquid inside the liquid chamber 6, and an action member 5 placed on the side opposite to the driving plate 7 in the liquid chamber 6 so as to contact the liquid inside the liquid chamber 6. The contact area of the action member 5 to the liquid inside the liquid chamber 6 is set smaller than that of the driving plate 7. The end portion of the action member 5 on the side opposite to the liquid chamber 6 is allowed to expose the outside through a hole formed in the cylinder case 8. Since all the members including the piezo-actuator 2 are housed inside the cylinder case 8, the vibration control device 1 of the present embodiment 1 is miniaturized, thereby making it possible to save the device space.

The piezo-actuator 2 is allowed to vibrate slightly in accordance with electric signals supplied thereto from a driver, not shown. The direction of the vibration is in parallel with a direction in which the piezo-actuator 2, the rubber vibration isolator 3 and the liquid lever mechanism 4 are linearly aligned. Moreover, on both of the ends of the rubber vibration isolator 3 in the linearly aligned direction are respectively placed thin rigid plates 9a and 9b made of, for example, metal and resin. The installation of the rigid plates 9a and 9b on both of the sides of the rubber vibration isolator 3 makes it possible to effectively transmit the displacement of the piezo-actuator 2 that is locally placed to the liquid inside the liquid chamber 6.

Moreover, between the side faces of the action member 5 and the driving plate 7 and the cylinder case 8 are respectively placed elastic seal members 10a and 10b that plug the gaps so as to prevent the liquid inside the liquid chamber 6 from leaking. In the present embodiment, the elastic seal member 10a, located on the peripheral edge of the driving plate 7, is set to have a contact area to the liquid inside the liquid chamber of less than 1% of the contact area to the liquid inside the liquid chamber of the driving plate 7. For this reason, even when the elastic seal member 10a is deformed due to the internal pressure of the liquid chamber 6 at the time of a shift of the action member 5 and the driving plate 7, the change in the volume of the liquid chamber is small so that the transmission efficiency of the force to the action member 5 is maintained in a high level. Here, the elastic seal member 10a also has a function to protect the action member 5 upon application of a shearing force thereto.

With respect to the elastic seal members 10a and 10b, for example, O-rings or X-rings may be used. The elastic seal members 10a and 10b may be maintained so as not to slide with respect to the cylinder case 8, thereby allowing the action member 5 and the driving plate 7 to move through its elastic distortion, while sealing the periphery of these members. Alternatively, it may be maintained so as to slide with respect to the cylinder case 8, while sealing the periphery of the action member 5 and the driving plate 7.

A space, which is located on the side opposite to the liquid chamber 6 with respect to the driving plate 7 and in which none of the piezo-actuator 2, rubber vibration isolator 3 and rigid plates 9a and 9b are placed, is filled with air, and the air pressure is controlled by a device (see FIG. 11) such as a valve or a compressor (not shown). In other words, in this space, the air pressure is adjustable so that this functions as an air spring that is placed in parallel with the piezo-actuator 2. Therefore, a load imposed on the piezo-actuator 2 is controlled by adjusting the air pressure of the space so that it becomes possible to optimally operate the piezo-actuator 2.

An explanation will be given of the operation of the vibration control device 1 of the present embodiment having the above-mentioned arrangement. In the vibration control device 1, when piezo-actuator 2 is driven to generate vibration, the vibration is transmitted to the driving plate 7 through the rubber vibration isolator 3. The driving plate 7 is shifted by virtually the same amount as the amount of displacement of the piezo-actuator 2; however, the contact area of the action member 5 to the liquid is smaller than that of the driving plate 7 so that the shift of the action member 5 is enlarged by the corresponding ratio between the two members. In other words, when the ratio of the liquid contact area of the action member 5 and the driving plate 7 is 1:10, the ratio of shift of the action member 5 and the driving plate 7 is represented by 10:1 (where there is a slight loss in an actual case). In this manner, in the present embodiment, since the liquid lever mechanism 4 is installed so that the displacement of the piezo-actuator 2 can be enlarged and taken out. For this reason, the number of laminated layers of the piezo-actuator can be reduced as compared with the conventional device, thereby making it possible to greatly reduce the production costs.

Moreover, in the vibration control device 1 of the present embodiment, since the liquid lever mechanism 4, the piezo-actuator 2 and the rubber vibration isolator 3 are placed in series with one another, the inherent frequency of the vibration control device 1 is smaller than that of a conventional device in which the rubber vibration isolator 3 is not linearly aligned. For this reason, it is possible to obtain a superior passive vibration blocking performance.

Figure 2:
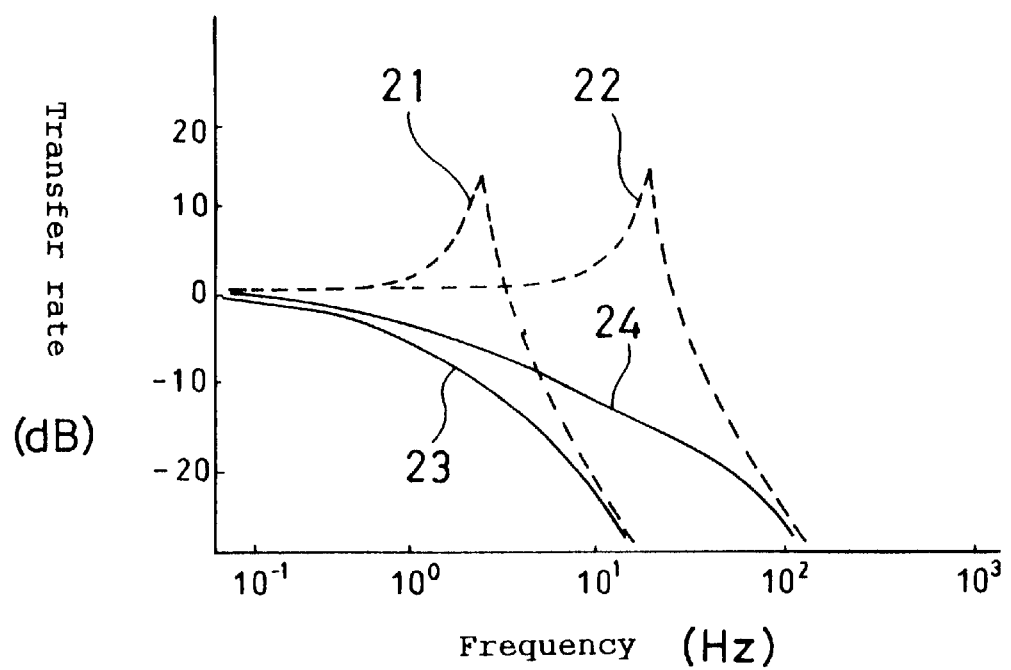
FIG. 2 is a graph that shows vibration characteristics of the vibration control device shown in FIG. 1 and a conventional vibration control device.

Referring to FIG. 2, an explanation will be given on this point. FIG. 2 shows graphs that indicate the inherent vibration characteristics of the vibration control device 1 of the present embodiment and another vibration control device that is constituted in the same manner except that no linearly-aligned rubber vibration isolator 3 is installed therein, and that also show the vibration blocking characteristics of the respective vibration control devices upon application of an active controlling operation. In FIG. 2, curve 21 represents the inherent vibration characteristic of the vibration control device 1, and curve 22 represents the inherent vibration characteristic of the vibration control device without the rubber vibration isolator 3. Moreover, curve 23 represents the vibration blocking characteristic of the vibration control device 1 upon application of the active controlling operation, and curve 24 represents the vibration blocking characteristic upon application of the active controlling operation by using the vibration control device without the rubber vibration isolator 3.

As clearly shown in FIG. 2, curve 21 has a shape obtained by shifting curve 22 toward the low frequency side as a whole. Moreover, with respect to curves 23 and 24, the vibration transmissiblity is lowered on the low frequency side because of their active vibration blocking characteristics. In contrast, the vibration transmissiblity is lowered on the high frequency side on which they are respectively asymptotical to curves 21 and 22 because of their passive vibration blocking characteristics.

As clearly indicated by the comparison between the transmissiblity at the time of the same frequency, the transmissiblity of the vibration control device 1 of the present embodiment reduces more greatly toward the high frequency side as compared with the vibration control device without the linearly-aligned rubber vibration isolator 3, thereby indicating that it has a superior passive vibration blocking characteristic. Therefore, the vibration control device 1 of the present embodiment is allowed to exert a superior active vibration blocking characteristic with a greater displacement in low frequency bands, and also to exert a superior passive vibration blocking characteristic in high frequency bands, while maintaining the advantage of the piezo-actuator 2 enabling a high-speed response with a small capacity. Thus, it is possible to achieve a vibration control system which has not been realized by a conventional vibration control device at comparatively low costs.

Moreover, in the vibration control device 1 of the present embodiment, the rubber vibration isolator 3 is placed in series with both of the liquid lever mechanism 4 and the piezo-actuator 2 between them; therefore, as compared with a case in which the rubber vibration isolator 3 is placed on the side opposite to the driving plate 7 with respect to the action member 5, it is possible to use even such a rubber vibration isolator which has a greater elastic modulus with a smaller displacement as the rubber vibration isolator 3. Thus, it becomes possible to use a rubber vibration isolator 3 with a comparatively small volume, and consequently to further miniaturize the vibration control device 1.

Moreover, the vibration control device 1 of the present embodiment, which uses the liquid lever mechanism as the displacement enlarging mechanism, is advantageous in that, as compared with a system having a mechanical displacement enlarging mechanism using a lever, for example, like the second embodiment as will be described below, it has a comparatively simple structure, and hardly has any high-order vibration modes in the degree of freedom in the non-rigidity internal structure.

<Second Embodiment>

Figure 3:
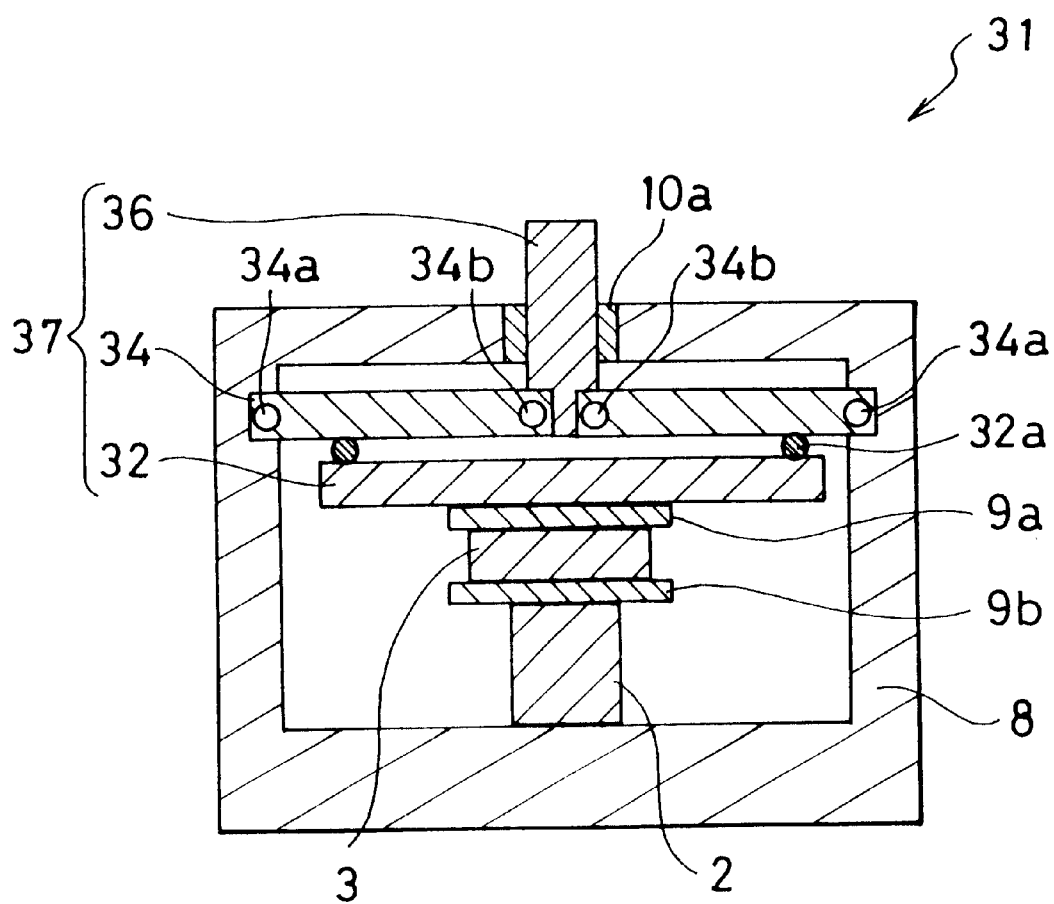
FIG. 3 is a cross-sectional view showing a vibration control device in accordance with a second embodiment of the present invention.

Referring to FIG. 3, an explanation will be given of the second embodiment of the present invention. Here, in the present embodiment, those members that are the same as those of the first embodiment are indicated by the same reference numbers, and the description thereof is omitted. In a vibration control device 31 of the present embodiment, a mechanical lever mechanism 37 is installed in place of the liquid lever mechanism 4 using in the first embodiment.

The mechanical lever mechanism 37 is provided with a driving plate 32 placed on the rubber vibration isolator 3 side, a lever 34 for enlarging the shift of the driving plate 32 as will be described later, and an action member 36 that is placed on the side opposite to the driving plate 32 with respect to the lever 34. The end portion of the action member 36 on the side opposite to the lever 34 is allowed to expose the outside through a hole formed in the cylinder case 8. The lever 34 has its one end 34a connected to the cylinder case in a manner so as to freely pivot thereon, and also has the other end 34b connected to the action member 36 in a manner so as to freely pivot thereon. Moreover, the lever 34 is allowed to contact a support section 32a placed on the driving plate 32 at a comparatively small area so that it is supported on the driving plate 32.

In the vibration control device 31 of the present embodiment having the above-mentioned structure, when the piezo-actuator 2 is driven to generate vibration, the vibration is transmitted to the driving plate 32 through the rubber vibration isolator 3. When the driving plate 32 is shifted upward and downward, the lever 34, which is subjected to a force from the support section 32a, is allowed to pivot on its end portion 34a so that the action member 36 is shifted upward and downward. In this case, (the size of the shift of the action member 36:the size of the shift of the driving plate 32) is equal to (the distance between the respective ends 34a and 34b of the lever 34:the distance between the end portion 34a of the lever 34 and the support section 32a); thus, the shift of the driving plate 32 is enlarged and taken out from the action member 36.

In this manner, in accordance with the present embodiment, the installation of the mechanical lever mechanism 37 makes it possible to enlarge the displacement of the piezo-actuator 2 so as to be taken out. For this reason, it becomes possible to reduce the number of the laminated layers of the piezo-actuator as compared with a conventional system, and consequently to greatly cut the manufacturing costs. Moreover, in the vibration control device 31 of the present embodiment, since the mechanical lever mechanism 3, the piezo-actuator 2 and the rubber vibration isolator 3 are placed in series with one another, the inherent frequency of the vibration control device 31 is smaller than that of a conventional device in which the rubber vibration isolator 3 is not linearly aligned. For this reason, it is possible to obtain a superior passive vibration blocking performance. Furthermore, the miniaturization of the rubber vibration isolator 3 makes the vibration control device 31 more compact. Here, these effects can be obtained in the same manner also in the following embodiments.

<Third Embodiment>

Figure 4:
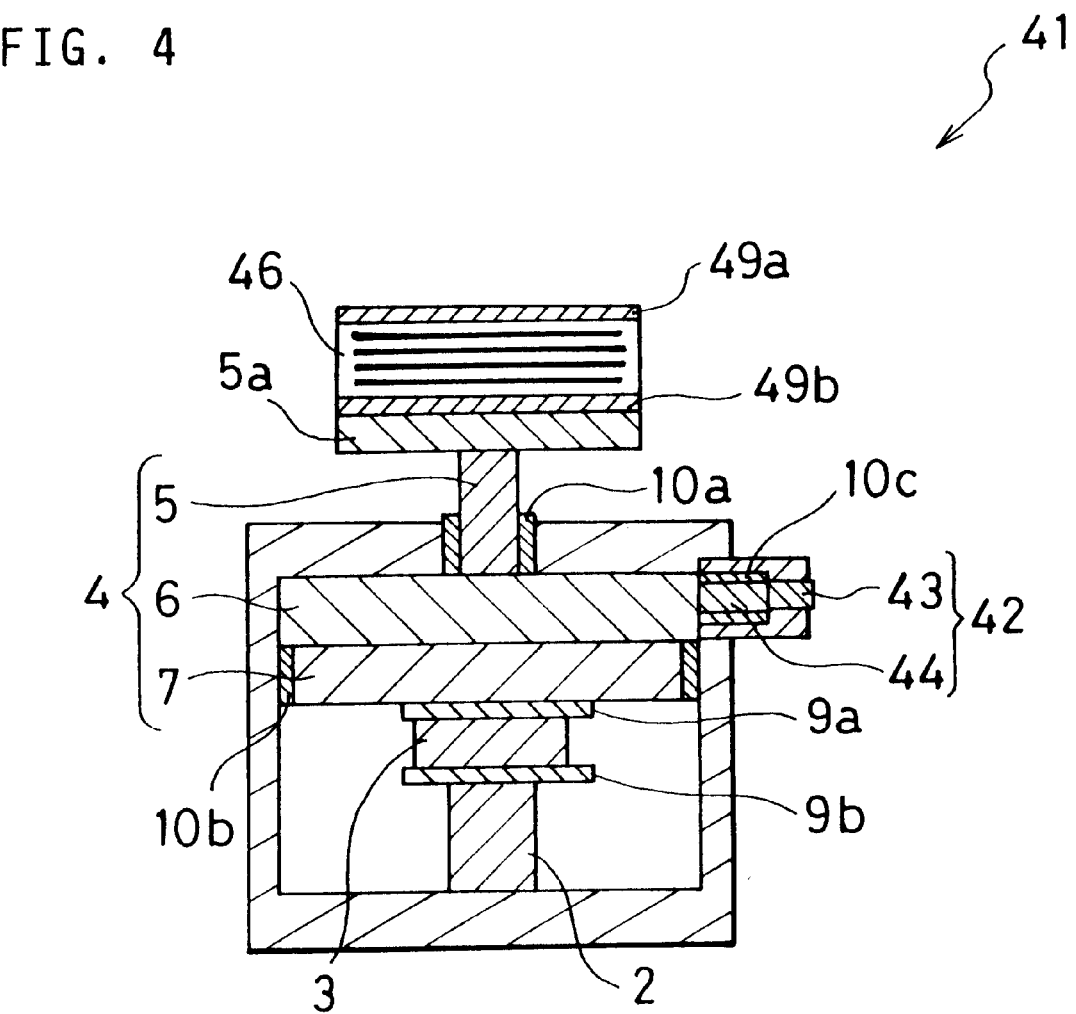
FIG. 4 is a cross-sectional view showing a vibration control device in accordance with a third embodiment of the present invention.

Referring to FIG. 4, the following description will discuss the third embodiment of the present invention. Here, those members that have the same functions and that are described in the first and second embodiments are indicated by the same reference numbers and the description thereof is omitted. In a vibration control device 41 of the present embodiment, in addition to the rubber vibration isolator 3 placed between the liquid lever mechanism 4 and the piezo-actuator 2 in the first embodiment, a laminated elastic member 46 is placed at the top 5a of the action member 5 on the side opposite to the liquid chamber 6. The laminated elastic member 46 is a non-interference elastic member formed by alternately laminating steel plates (or resin plates or both of these) and elastomer plates such as rubber vibration isolator. Rigid plates 49a and 49b are placed on the respective ends of the laminated elastic member 46.

In this manner, in the present embodiment, the laminated elastic member 46, which is placed in series with the piezo-actuator 2 and the liquid lever mechanism 4, is installed; therefore, even in the case when a shearing force is applied from outside in a direction orthogonal to the displacement direction (that is, the series aligned direction) of the action member 5, the laminated elastic member 46 serves as a cushion member so that the action member 5 is not subjected to a great shearing force. Consequently, it is possible to prevent damages to the action member 5 effectively. Here, the laminated elastic member 46 may be a normal elastic member that is not laminated; however, the laminated non-interference elastic member as in the case of the present embodiment functions as a cushion member against the shearing force more effectively.

Moreover, in the vibration control device 41 of the present embodiment, a liquid chamber pressure control mechanism 42 for adjusting the pressure inside the liquid chamber 6 is further installed. The liquid chamber pressure control mechanism 42 is provided with a piston section 44 which is allowed to invade the liquid chamber 6, and a piston-position adjusting section 43 for adjusting the depth of invasion inside the liquid chamber 6 in the piston position 44 in accordance with the back and forth movement, for example, by the rotation of a thread. The periphery of the piston section 44 is sealed by the elastic seal member 10c so that the liquid inside the liquid chamber 6 is free from external leakage.

In the present embodiment, the depth of invasion of the piston section 44 into the liquid chamber 6 is adjusted by the piston position adjusting section 43 so as to control the pressure inside the liquid chamber 6. Therefore, it is possible to easily adjust the level of pressurization applied to the piezo-actuator 2.

<Fourth Embodiment>

Figure 5:
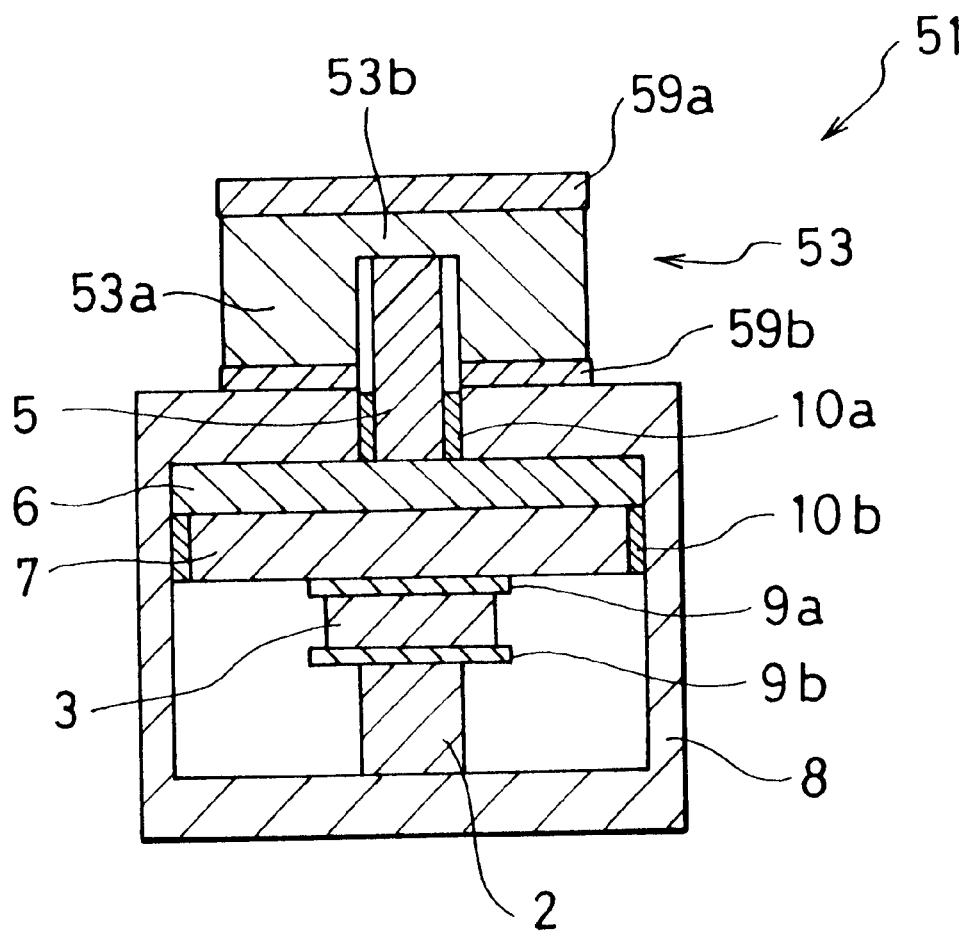
FIG. 5 is a cross-sectional view showing a vibration control device in accordance with a fourth embodiment of the present invention.

Referring to FIG. 5, the following description will discuss the fourth embodiment of the present invention. Here, those members that have the same functions and that are described in the first to third embodiments are indicated by the same reference numbers and the description thereof is omitted. A vibration control device 51 of the present embodiment features that a rubber vibration isolator 53 is placed outside the liquid chamber 6 in series with the action member 5 as well as in parallel therewith. Rigid plates 59a and 59b are placed on the respective ends of the rubber vibration isolator 53.

A portion 53a of the rubber vibration isolator 53, aligned in parallel with the action member 5, shares an externally applied force with the action member 5 so as to reduce the load externally applied to the action member 5. For this reason, it is possible to carry out vibration control with higher precision, and the control efficiency increases as the vibration damping in the rubber vibration isolator 53 decreases. Moreover, another portion 53b of the rubber vibration isolator 53, aligned in series with the action member 5, functions as a cushion member against the shearing force applied to the action member 5 in the same manner as the laminated elastic member 32 as described in the second and third embodiments. Here, the parallel portion 53a and series portion 53b may be provided as separated portions.

<Fifth Embodiment>

Figure 6:
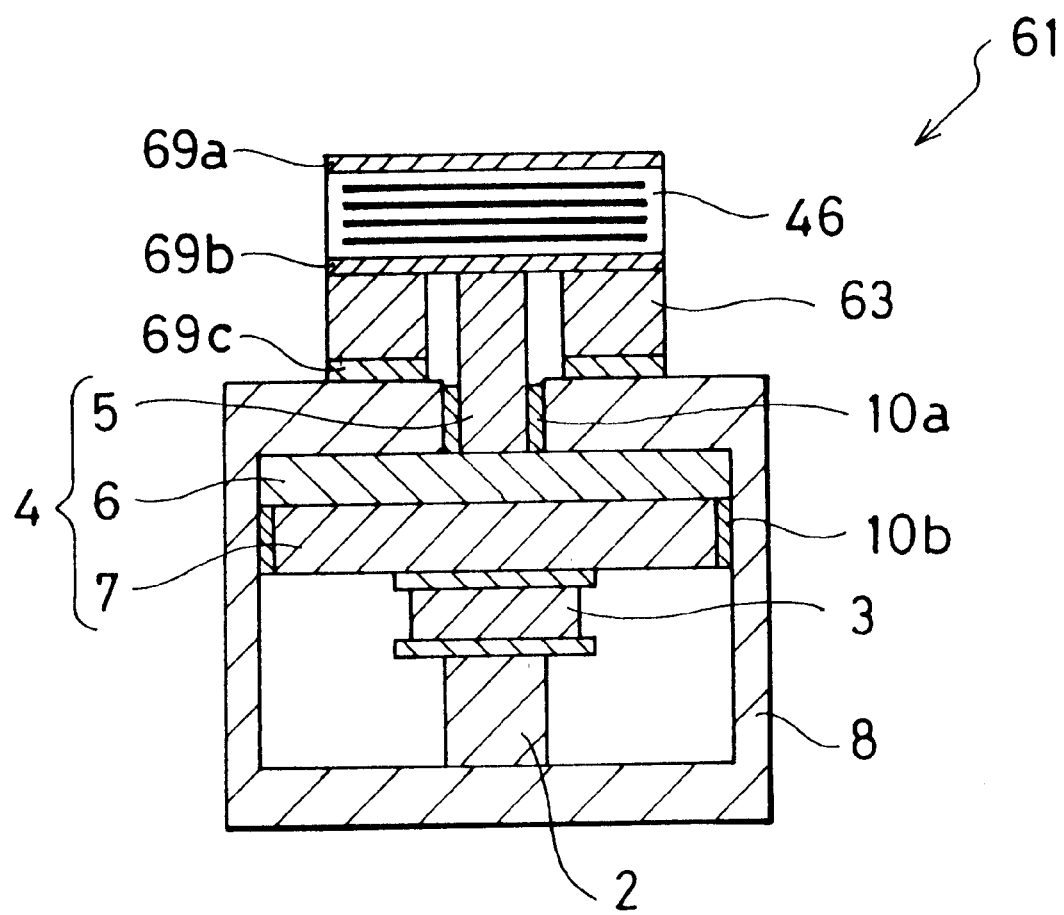
FIG. 6 is a cross-sectional view showing a vibration control device in accordance with a fifth embodiment of the present invention.

Referring to FIG. 6, the following description will discuss the fifth embodiment of the present invention. Here, those members that have the same functions and that are described in the first through fourth embodiments are indicated by the same reference numbers and the description thereof is omitted. In a vibration control device 61 of the present embodiment which has a modified structure of the vibration control device 51 of the fourth embodiment, the rubber vibration isolator 53 is replaced by the laminated elastic member 46 forming the series portion and a rubber vibration isolator 63 forming the parallel portion with respect to the action member 5. Here, rigid plates 69a, 69b and 69c are placed at the respective ends and the border portion of these members. In the present embodiment, the series portion is replaced by the laminated elastic member 46 that is a non-interference elastic member so that it is possible to effectively release an externally applied shearing force so as to properly protect the action member 5.

<Sixth Embodiment>

Figure 7:
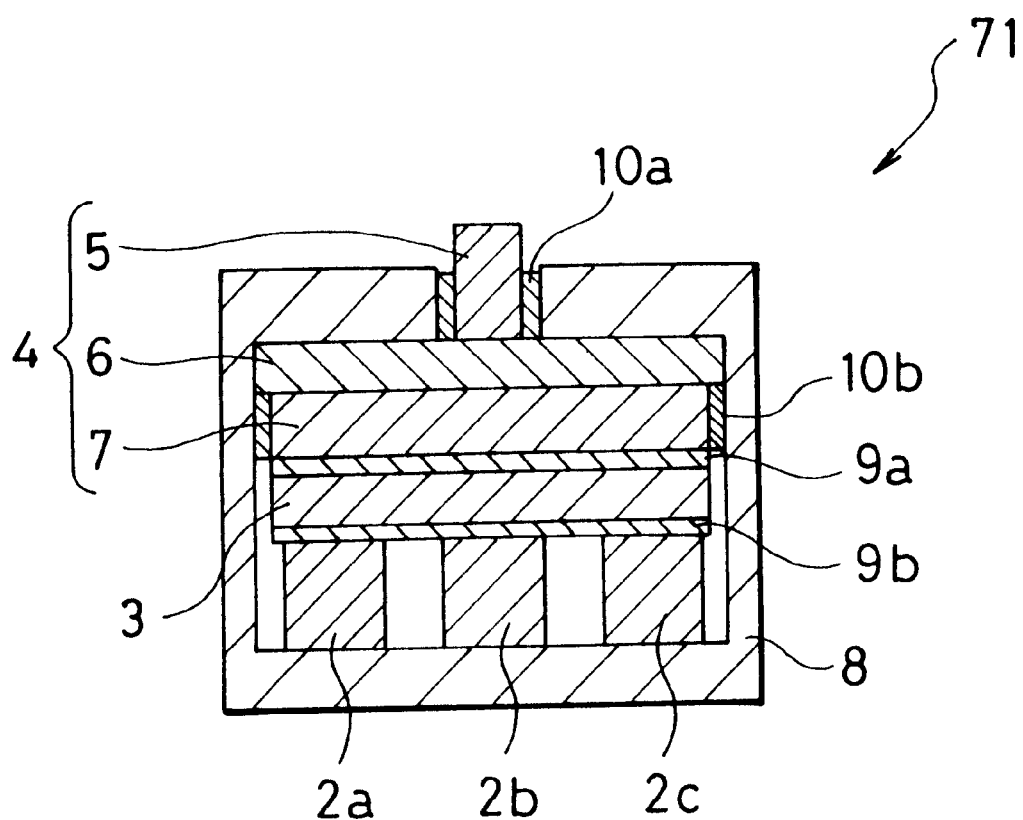
FIG. 7 is a cross-sectional view showing a vibration control device in accordance with a sixth embodiment of the present invention.

Referring to FIG. 7, the following description will discuss the sixth embodiment of the present invention. Here, those members that have the same functions and that are described in the first through fifth embodiments are indicated by the same reference numbers and the description thereof is omitted. In a vibration control device 71 of the present embodiment which has a modified structure of the vibration control device 1 of the first embodiment, the single piezo-actuator 2 is replaced by three piezo-actuators 2a, 2b and 2c that are aligned parallel to each other in a manner so as to be separated from each other. The three piezo-actuators 2a, 2b and 2c are driven in synchronism with each other in accordance with signals from a driving section, not shown. Thus, the vibration control device 71 of the present embodiment is allowed to generate a greater controlling force.

<Seventh Embodiment>

Figure 8:
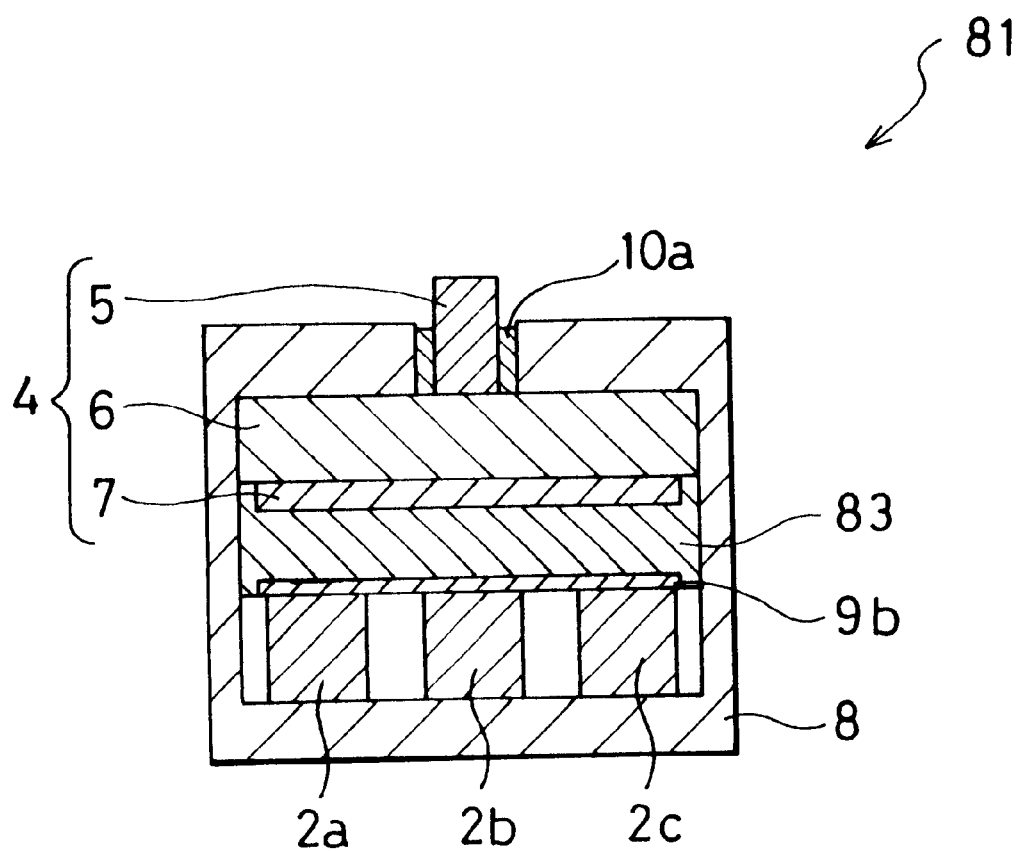
FIG. 8 is a cross-sectional view showing a vibration control device in accordance with a seventh embodiment of the present invention.

Referring to FIG. 8, the following description will discuss the seventh embodiment of the present invention. Here, those members that have the same functions and that are described in the first through sixth embodiments are indicated by the same reference numbers and the description thereof is omitted. In a vibration control device 81 of the present embodiment which has a modified structure of the vibration control device 71 of the sixth embodiment, a rubber vibration isolator 83 is allowed to closely contact the inner circumferential face of the cylinder case 8 so as to serve as a member for sealing the liquid chamber 6 in place of the elastic seal member 10b, and the rigid plate 9a is removed therefrom. In other words, this arrangement eliminates the necessity of installing the elastic seal member and the rubber vibration isolator as separated members, thereby making it possible to reduce the number of parts and the number of manufacturing processes. Therefore, the vibration control device 81 of the present embodiment can be produced at comparatively low costs.

<Eighth Embodiment>

Figure 9:
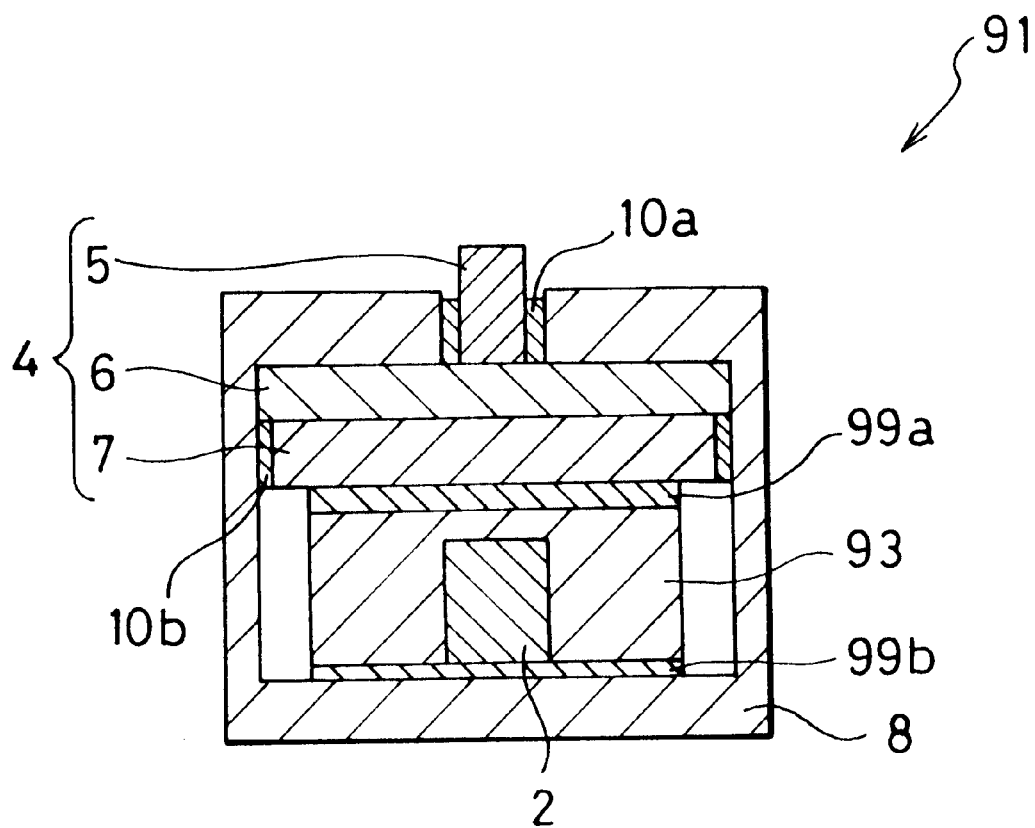
FIG. 9 is a cross-sectional view showing a vibration control device in accordance with an eighth embodiment of the present invention.

Referring to FIG. 9, the following description will discuss the eighth embodiment of the present invention. Here, those members that have the same functions and that are described in the first through seventh embodiments are indicated by the same reference numbers and the description thereof is omitted. In a vibration control device 91 of the present embodiment which has a modified structure of the vibration control device 1 of the first embodiment, a rubber vibration isolator 93 has a modified shape so that it is placed in series with the piezo-actuator as well as in parallel therewith, and rigid plates 99a and 99b are attached to the respective ends of the rubber vibration isolator 93. With this arrangement, the controlling process for an optimal operation of the piezo-actuator 2, which has been carried out by the adjustment of the air spring in the first embodiment, can be executed by the parallel-aligned portion of the rubber vibration isolator 93. Therefore, it is possible to eliminate valves and compressors connected to the air spring as in the case of the first embodiment, and consequently to simplify the device structure. Moreover, since the rubber vibration isolator 93 makes it possible to seal the piezo-actuator 2 from the outside air, it becomes possible to shield the piezo-actuator 2 from influences of outside humidity, and consequently to ensure a long service life of the piezo-actuator. Here, the series-aligned portion and the parallel-aligned portion of the rubber vibration isolator 93 may be provided as separated portions.

<Ninth Embodiment>

Figure 10:
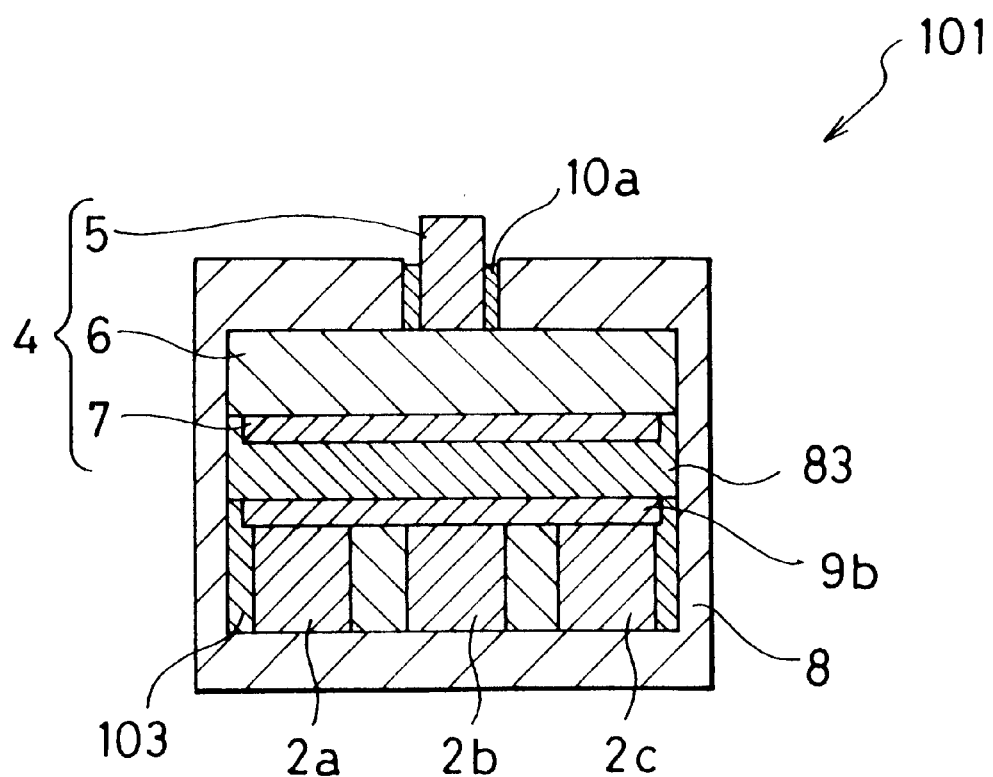
FIG. 10 is a cross-sectional view showing a vibration control device in accordance with a ninth embodiment of the present invention.

Referring to FIG. 10, the following description will discuss the ninth embodiment of the present invention. Here, those members that have the same functions and that are described in the first through eighth embodiments are indicated by the same reference numbers and the description thereof is omitted. In a vibration control device 101 of the present embodiment which has a modified structure of the vibration control device 81 of the seventh embodiment, the peripheral portion of the three piezo-actuators 2a, 2b and 2c, aligned in parallel with each other so as to be separated from each other, are coated and molded with elastomer 103. Here, another elastic material such as gel may be used instead of the elastomer 103. Moreover, FIG. 10 shows a state in which the gaps between the piezo-actuators 2a, 2b and 2c are filled with the elastomer 103; however, the elastomer 103 may be placed with gaps.

In the same manner as the eighth embodiment, the present embodiment can achieve the effect that an optical controlling process for the operation of the piezo-actuator 2 is achieved by a simple device structure, and can also shield the piezo-actuators 2a, 2b and 2c from outside air by using elastomer 108; therefore, it becomes possible to shield the piezo-actuators 2a, 2b and 2c from influences of outside humidity, and consequently to ensure a long service life of the piezo-actuators 2a, 2b and 2c.

<Tenth Embodiment>

Figure 11:
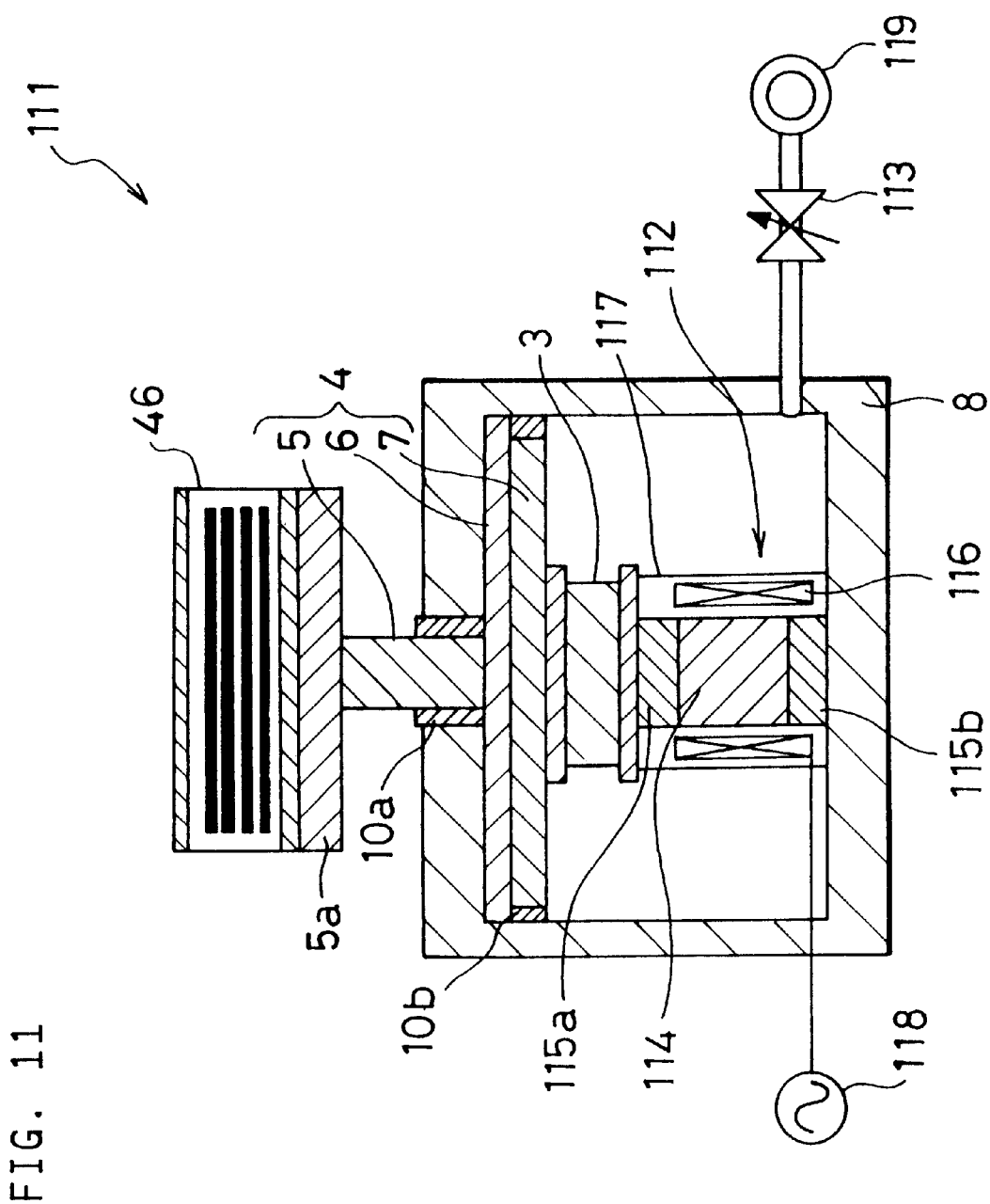
FIG. 11 is a cross-sectional view showing a vibration control device in accordance with a tenth embodiment of the present invention.

Referring to FIG. 11, the following description will discuss the tenth embodiment of the present invention. Here, those members that have the same functions and that are described in the first through ninth embodiments are indicated by the same reference numbers and the description thereof is omitted. In a vibration control device 111 of the present embodiment, instead of the piezo-actuator 2 used in the vibration control device of the first embodiment 1, a super-magnetostrictive actuator 112 containing a super-magnetostrictive element is used. The super-magnetostrictive actuator 112 is constituted by a super-magnetostrictive rod 114, bias permanent magnets 115a and 115b placed on both of the ends of the vibration displacement direction of the super-magnetostrictive rod 114, and a driving coil 116 that is placed on the side of the super-magnetostrictive rod 114; and these are molded by elastomer 117 into one integral unit. The driving coil 116 is connected to an external driving circuit 118 so that when driven by this, it generates a magnetic field on the super-magnetostrictive rod 114.

The super-magnetostrictive rod 114 is preferably composed of, for example, a rare-earth metal and iron that exist at the ratio of 1:2; and for example, materials, such as $TbFe_2$, $DyFe_2$, $SmFe_2$, $HoFe_2$, $ErFe_2$ and $Tb_{0.3}\,Dy_{0.7}\,Fe_2$, may be used. The super-magnetostrictive actuator 112 having such a super-magnetostrictive rod 114 has superior characteristics such as a great maximum magnetostriction, a high-speed response and great power generation; therefore, it is preferably applied to the vibration control device 111 in the present embodiment.

Moreover, the vacant section within the cylinder case 8 is connected to an air pressure source 119 through an air regulator 113. As described above, in this arrangement, the pressure of the vacant section within the cylinder case 8 is desirably controlled so that the load applied to the super-magnetostrictive actuator 112 can be adjusted to an optimal value. Here, in the same manner as the vibration control device 41 of the third embodiment, the vibration control device 111 is provided with a laminated elastic member 46, placed in series with a super-magnetostrictive actuator 112 and the liquid lever mechanism 4, which is attached to the tip portion 5a of the action member 5 on the side opposite to the liquid chamber 6.

<Eleventh Embodiment>

Figure 12:
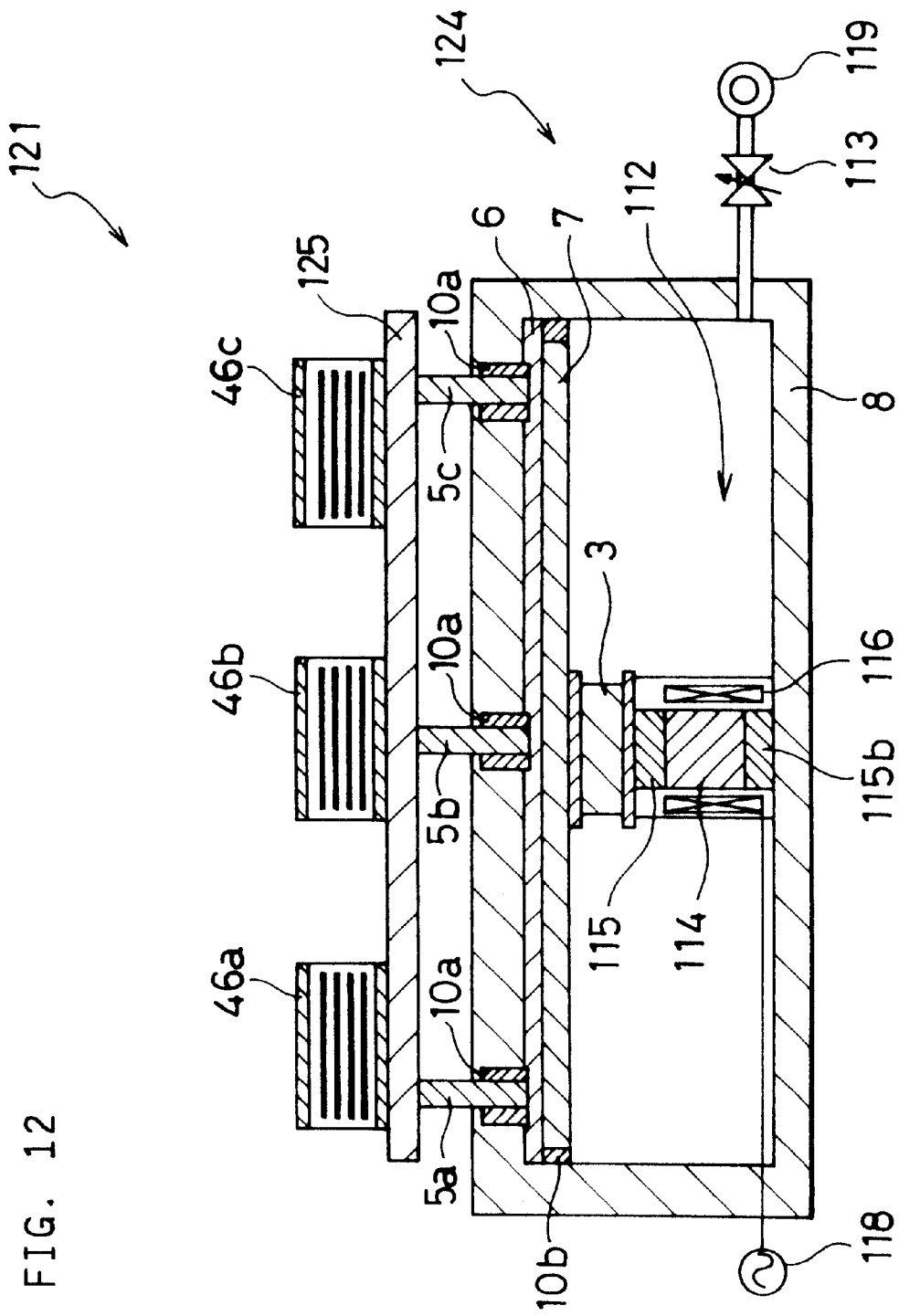
FIG. 12 is a cross-sectional view showing a vibration control device in accordance with an eleventh embodiment of the present invention.

Referring to FIG. 12, the following description will discuss the eleventh embodiment of the present invention. Here, those members that have the same functions and that are described in the first through tenth embodiments are indicated by the same reference numbers and the description thereof is omitted. A vibration control device 121 of the present embodiment is provided with a liquid lever mechanism 124 having three action members 5a, 5b and 5c that are placed in parallel with each other and that are attached to one liquid chamber 6, and support plates 125 attached to the tips of the three action members 5a, 5b and 5c are allowed to support three laminated elastic members 46a, 46b and 46c. With this arrangement, operational forces are simultaneously applied to different portions of a comparatively large object so as to drive the object stably, or the operational forces are simultaneously applied to a plurality of different objects so as to drive them simultaneously.

<Twelfth Embodiment>

Figure 13:
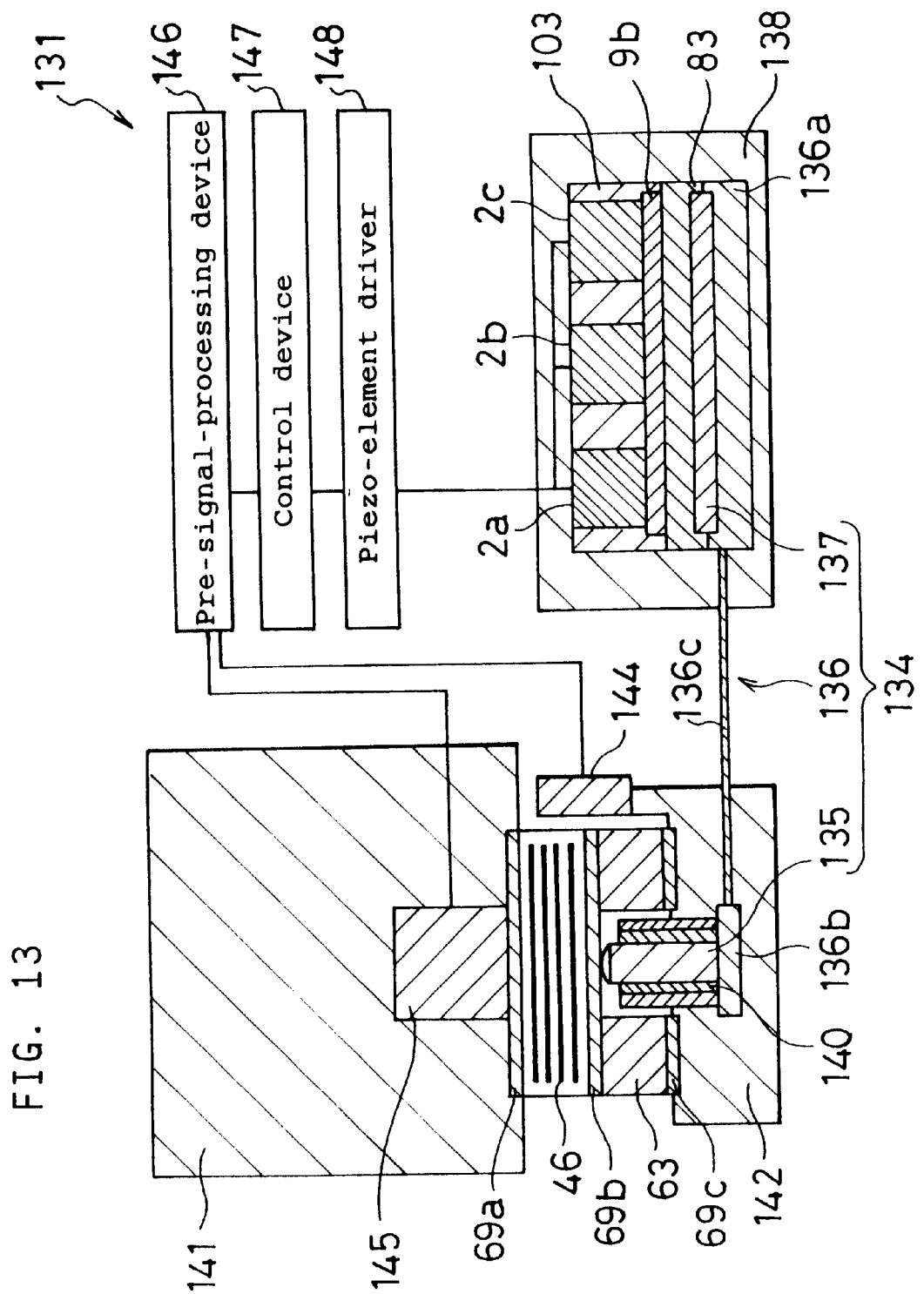
FIG. 13 is a cross-sectional view showing a vibration control device in accordance with a twelfth embodiment of the present invention.

Referring to FIG. 13, the following description will discuss the twelfth embodiment of the present invention. Here, those members that have the same functions and that are described in the first through eleventh embodiments are indicated by the same reference numbers and the description thereof is omitted. In the present embodiment, an explanation will also be given of a driving method of a vibration control device that is executed when a vibration generation process or a vibration controlling process is applied to a controlling target member coupled to the vibration control device. Here, the driving method of the vibration control device to be explained in the present embodiment is applicable to the vibration control devices of the other embodiments in the same manner.

In a vibration control device 131 of the present embodiment, a liquid chamber 136, which constitutes one portion of a liquid lever mechanism 134, is divided into a first liquid chamber 136a placed inside a cylinder case 138, a second liquid chamber 136b placed on a lower face plate 142 on which the action member 135 is installed and a pipe 136c connecting the two chambers. Moreover, the peripheral portion of the action member 135 is sealed with an elastic seal member 140 so that a force applied from the action member 135 is transmitted to an upper face plate 141 that is a control target member, through a laminated elastic member 46. A sensor 144 for measuring the distance from the upper face plate 141 is placed on the lower face plate 142, and a sensor 145 for measuring the vibration acceleration is placed on the upper face plate 141. Moreover, inside the cylinder case, piezo-actuators 2a, 2b and 2c, molded by elastomer 103, a rubber vibration isolator 83 and a driving plate 137 are aligned in series with each other, and housed.

The detection signals obtained from the sensors 144 and 145 are supplied to a pre-signal-processing device 146. Based upon signals from the pre-signal-processing device 146, a control device 147 finds control signals to be supplied to the piezo-actuators 2a, 2b and 2c. Then, in accordance with the control signals, the respective piezo-actuators 2a, 2b and 2c are driven by a piezo-element driver 148.

In this manner, in the vibration control device 131 of the present embodiment, the two liquid chambers 136a and 136b are connected by the pipe 136c so that the installation places of the piezo-actuators 2a, 2b, 2c and the installation place of the action member 135 can be separated with a desired distance corresponding to the length of the pipe 136c. Moreover, in the first through eleventh embodiments, the displacement direction of the driving plate and the displacement direction of the action member are always the same; however, in the present embodiment, these directions are completely reversed to each other. In other words, the application of the liquid lever mechanism 134 makes it possible to desirably select which direction the force is exerted in. Therefore, the piezo-actuators 2a, 2b and 2c are installed at positions where they are easily maintenanced, while the action member 135 can be oriented in a manner indifferent from the attitudes of the piezo-actuators 2a, 2b and 2c.

Next, an explanation will be given of a driving method for the vibration control device 131 of the present embodiment. In the case when desired vibration is generated on the upper face plate 141, first, the vibration signal of the upper face plate 141 is measured by the sensor 145 with respect to the displacement direction (in this case, vertical direction) of the action member 135. Then, based upon the vibration signal, a feed-back control is carried out so that a driving signal, which allows the upper face plate 141 to exert predetermined vibration, is generated by the control device 147 and the driver 148. Thus, this driving signal is used for driving the piezo-actuators 2a, 2b and 2c. Such a controlling process allows the upper face plate 141, which is a control target member, to exert the desired vibration. Moreover, in the case when the vibration of the upper face plate 141 is suppressed, the vibration control device 131 may be driven in the same manner.

Moreover, the controlling process may be carried out by also utilizing a displacement signal from the sensor 144. In other words, the relative displacement of the upper face plate 141 is detected by the sensor 144 so that the relative positional error from the target position of the upper face plate 141 is found by the control device 147. Then, in order to allow the upper face plate 141 to trace the target position, electric signals to be applied to the piezo-actuators 2a, 2b and 2c are controlled by the control device 147. Such a controlling process makes it possible to maintain the distance between the upper face plate 141 and the lower face plate 142 at an appropriate distance.

Moreover, in the present embodiment, a voltage supply is cut off from any of the piezo-actuators 2a, 2b, 2c that has been damaged. This arrangement makes it possible to prevent wasteful power consumption, and consequently to achieve a reduction in the power consumption in the driving process. For this reason, the respective piezo-actuators 2a, 2b and 2c are provided with sensors (not shown) that are used for damage detection, and detection signals from these sensors are supplied to the control device 147.

<Thirteenth Embodiment>

Figure 14:
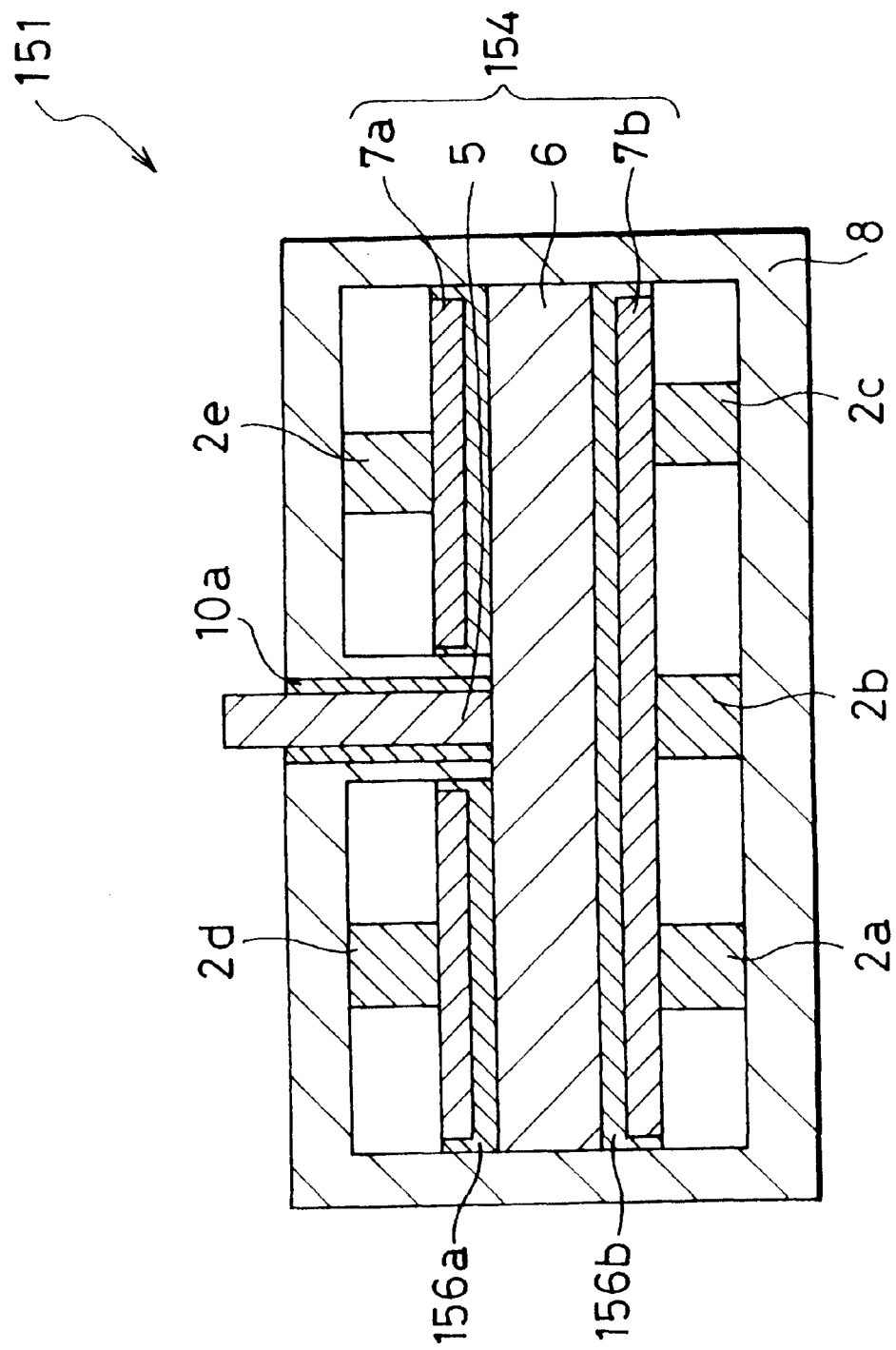
FIG. 14 is a cross-sectional view showing a vibration control device in accordance with a thirteenth embodiment of the present invention.

Next, referring to FIG. 14, the following description will discuss the thirteenth embodiment of the present invention. Here, those members that have the same functions and that are described in the first through twelfth embodiments are indicated by the same reference numbers and the description thereof is omitted. In the vibration control device 151 of the present embodiment, driving plates 7a and 7b as well as piezo-actuators 2a through 2e are aligned face to face with each other in an up and down direction with the liquid chamber 6 sandwiched in between. Further, a liquid lever mechanism 154 is constituted by the liquid chamber 6, the driving plates 7a and 7b for sandwiching this, and an action member 5 placed in the center of the driving plate 7a. The driving plate 7a is driven by the piezo-actuators 2d and 2e, and the driving plate 7b is driven by the piezo-actuators 2a, 2b and 2c.

Moreover, in the present embodiment, rubber vibration isolators 156a and 156b are respectively placed between the driving plate 7a and the liquid chamber 6 as well as the driving plate 7b and the liquid chamber 6. The rubber vibration isolators 156a and 156b seal the liquid chamber 6 so as to prevent the liquid from leaking in the same manner as the rubber vibration isolator 83 of the seventh embodiment. Moreover, the rubber vibration isolators 156a and 156b allow the natural frequency of the vibration control device 151 to reduce, thereby making it possible to exert a superior passive vibration blocking performance at high frequency bands, in the same manner as the rubber vibration isolator 3 of the first embodiment. Moreover, with respect to the rubber vibration isolators 156a and 156b, those which are hard and have a high elastic coefficient can be used, as compared with the case in which they are placed outside (on the side opposite to the liquid chamber 6) the action member 5; therefore, the volumes of the rubber vibration isolators 156a and 156b are made smaller so that the vibration control device 151 is allowed to have a compact structure.

Moreover, in the present embodiment, upon application to the cylinder case 8, hardly any operational force is externally released, and the operational forces, generated on the piezo-actuators 2a through 2e, can be given to the action member 5 at a higher rate as compared with the above-mentioned embodiments, thereby making it possible to operate the piezo-actuators 2a through 2e at a higher efficiency. Moreover, in the present embodiment, a number of piezo-actuators 2a through 2e are aligned face to face with each other so that it is also possible to place comparatively many piezo-actuators within a narrow flat face, and consequently to obtain a greater operational force.

<Fourteenth Embodiment>

Figure 15:
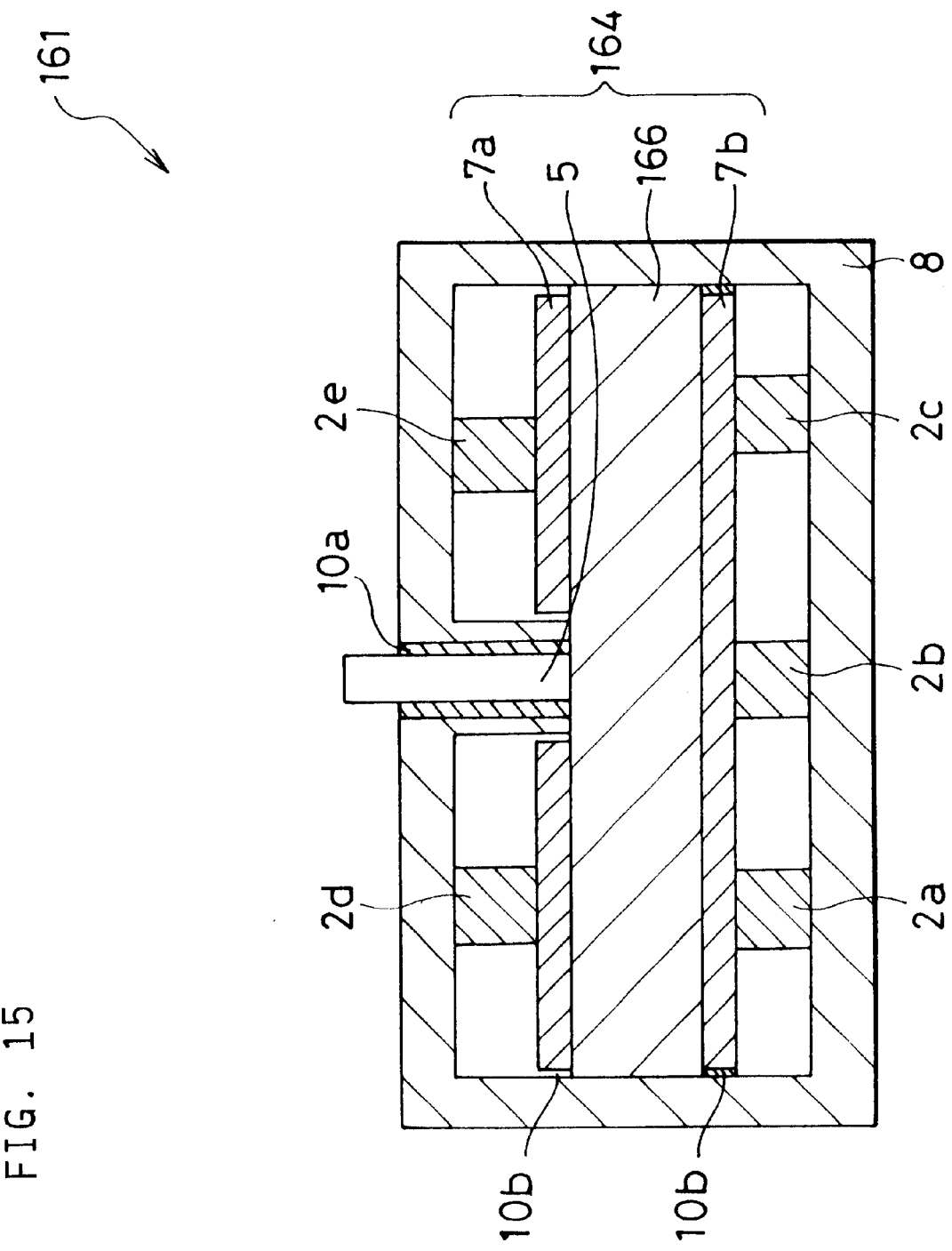
FIG. 15 is a cross-sectional view showing a vibration control device in accordance with a fourteenth embodiment of the present invention.

Next, referring to FIG. 15, the following description will discuss the fourteenth embodiment of the present invention. Here, those members that have the same functions and that are described in the first through thirteenth embodiments are indicated by the same reference numbers and the description thereof is omitted. The vibration control device 161 of the present embodiment is different from that of the thirteenth embodiment in that an elastic seal member 10b is placed instead of the rubber vibration isolators 156a and 156b, and in that a liquid in which a number of small particles that are elastically variable in their volumes are dispersed is used as the liquid inside the liquid chamber 166. With respect to the number of small particles that are elastically variable in their volumes, for example, a resin containing gas sealed therein and an elastomer powdered material may be used.

In the present embodiment, the many particles dispersed in the liquid chamber 166 function in the same manner as an elastic member so that it is possible to obtain the same effects as those of the aforementioned thirteenth embodiment without the need of installing an elastic member such as a rubber vibration isolator outside the liquid chamber 166 of a liquid lever mechanism 164. Therefore, it is possible to make the vibration control device 161 more compact while maintaining the above-mentioned effects.

<Fifteenth Embodiment>

Figure 16:
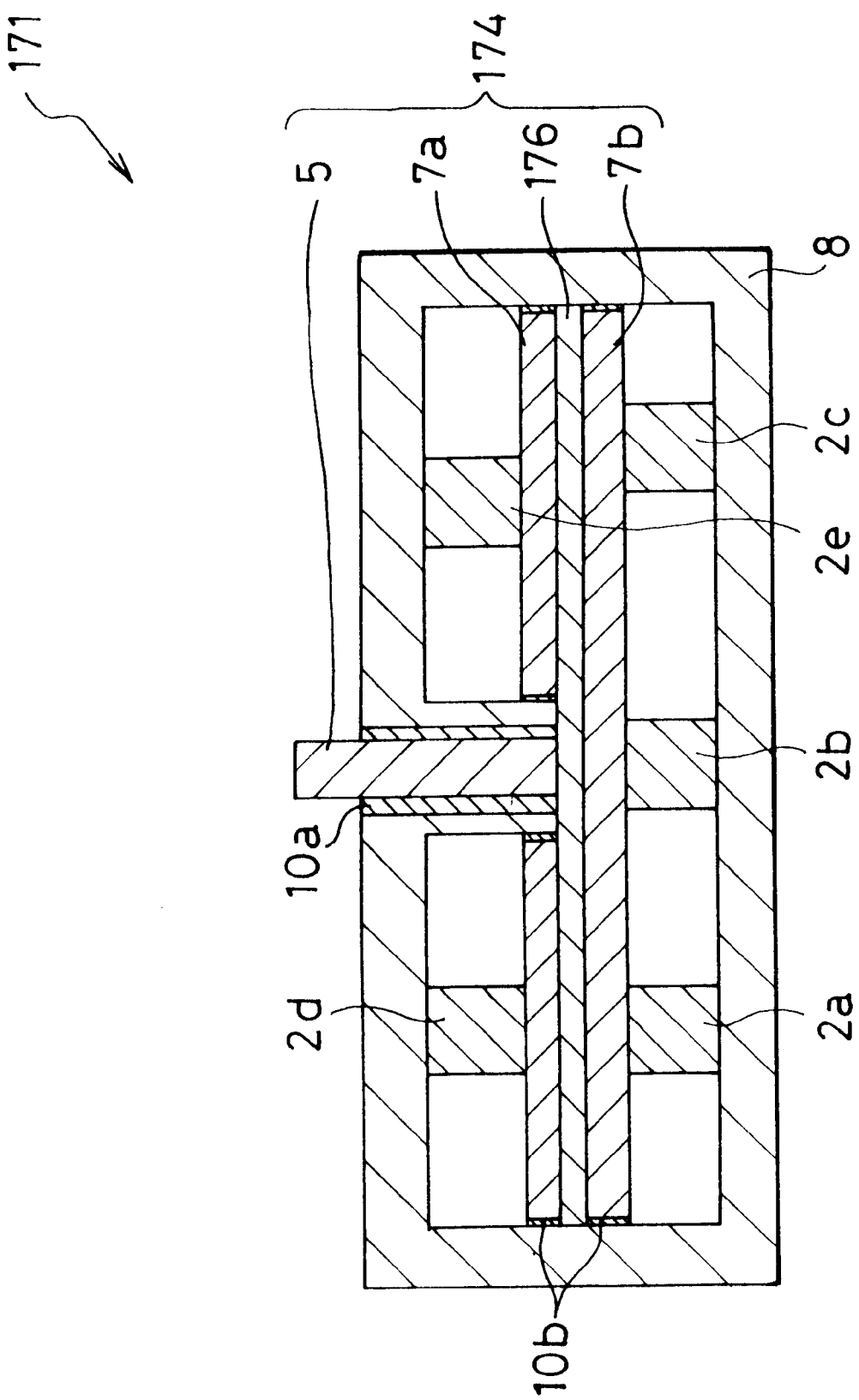
FIG. 16 is a cross-sectional view showing a vibration control device in accordance with a fifteenth embodiment of the present invention.

Next, referring to FIG. 16, the following description will discuss the fifteenth embodiment of the present invention. Here, those members that have the same functions and that are described in the first through fourteenth embodiments are indicated by the same reference numbers and the description thereof is omitted. The vibration control device 171 of the present embodiment is different from that of the fourteenth embodiment in that a gas lever mechanism 174 is used instead of the liquid lever mechanism 164. In the gas lever mechanism 174 is provided with a gas chamber 176 which has a very short height as compared with the liquid chamber 6, 166, with a narrowed distance between the upper and lower driving plates 7a and 7b.

The air chamber 176 of the air lever mechanism 174 having the above-mentioned structure functions as an elastic member so that, with the present embodiment, it becomes possible to obtain the same effects as those of the fourteenth and fifteenth embodiments. Moreover, the air lever mechanism 174 has a smaller size than the liquid lever mechanism used in the above-mentioned embodiments, and eliminates the necessity of further placing an elastic member outside thereof; therefore, it is possible to provide a very compact vibration control device.

<Sixteenth Embodiment>

Figure 17:
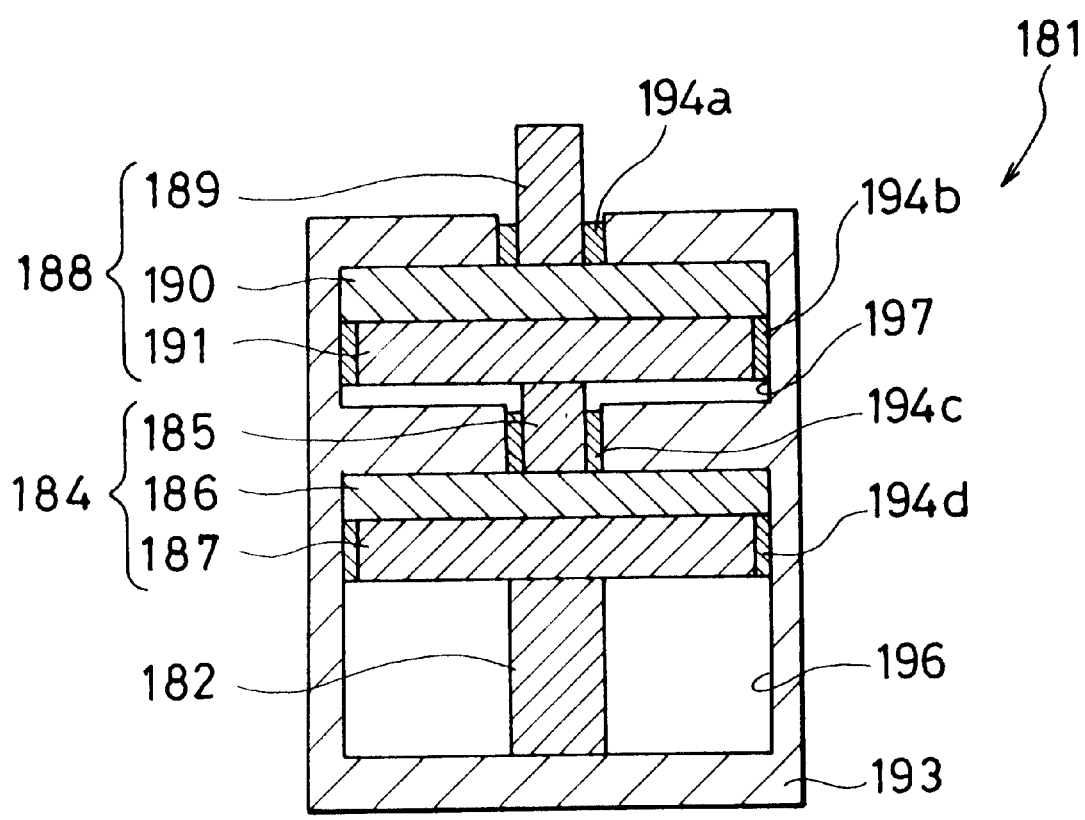
FIG. 17 is a cross-sectional view showing a vibration control device in accordance with a sixteenth embodiment of the present invention.

Next, referring to FIG. 17, the following description will discuss the sixteenth embodiment of the present invention. FIG. 17 is a cross-sectional view that shows a vibration control device in accordance with the sixteenth embodiment of the present invention. As illustrated in FIG. 17, the vibration control device 181 of the present embodiment has an arrangement in which a piezo-actuator 182 containing a piezo-element and first and second liquid lever mechanisms 184 and 188 serving as a displacement enlarging mechanism are placed in series with each other inside a cylinder case 193 in a manner so as to sandwich the first liquid lever mechanism 184.

Together with the piezo-actuator 182, the first liquid lever mechanism 184 is housed inside one 196 of two chambers 196 and 197 that are installed in the cylinder case 193. The first liquid lever mechanism 184 is constituted by a liquid chamber 186 in which liquid is sealed, a driving plate 187 placed between the liquid chamber 186 and the piezo-actuator 182 so as to contact the liquid inside the liquid chamber 186, and a connecting member 185 which is placed on the side opposite to the driving plate 187 with respect to the liquid chamber 186 so as to contact the liquid inside the liquid chamber 186. Here, the contact area of the liquid inside the liquid chamber 186 is set to be smaller on the connecting member 185 than on the driving plate 187. The end portion of the connecting member 185 on the side opposite to the liquid chamber 186 is allowed to protrude toward the other chamber 197 of the cylinder case 193 through a hole formed in a wall that divides the cylinder case 193 into the two chambers 196 and 197, and is connected to a driving plate 191 in the second liquid lever mechanism 188.

The second liquid lever mechanism 188 is housed in the chamber 197. The second liquid lever mechanism 188 is constituted by a liquid chamber 190 in which liquid is sealed, a driving plate 191 placed between the liquid chamber 190 and the connecting member 185 so as to contact the liquid inside the liquid chamber 190, and an action member 189 placed on the side opposite to the driving plate 191 with respect to the liquid chamber 190 so as to contact the liquid inside the liquid chamber 190. Here, the contact area of the liquid inside the liquid chamber 190 is set to be smaller on the action member 189 than on the driving plate 191. The end portion of the action member 189 on the side opposite to the liquid chamber 190 is exposed to outside. In this manner, since all the members including the piezo-actuator 182 are housed inside the cylinder case 193, the vibration control device 181 of the present embodiment is allowed to have a compact structure, thereby making it possible to save space.

The piezo-actuator 182 is allowed to vibrate slightly based upon electric signals supplied from a driver, not shown. The direction of the vibration is set to be parallel to the direction in which the piezo-actuator 182 and the first and second liquid lever mechanisms 184, 188 are aligned in series with each other.

Moreover, elastic seal members 194a and 194c are respectively placed between side faces of the action member 189 and the connecting member 185 and the cylinder case 193 so as to fill the gaps thereof, thereby preventing the liquid inside the liquid chambers 186 and 190 from leaking. Here, the same elastic seal members 194b and 194d are also placed between side faces of the driving plates 191, 187 and the cylinder case 193. The elastic seal members 194a and 194c also function so as to protect the action member 189 and the connecting member 185 upon application of a shearing force thereto.

In the chamber 196 inside the cylinder case 193, air is filled into a space in which the piezo-actuator 182 is not placed on the side opposite to the liquid chamber 186 with respect to the driving plate 187, and the air pressure is adjustable by using a device (see FIG. 20), such as a valve and a compressor, not shown. In other words, the space is adjustable in its air pressure, and functions as an air spring placed in parallel with the piezo-actuator 182. Therefore, the load to be applied to the piezo-actuator 182 is controlled by adjusting the air pressure in the space so that the piezo-actuator 182 can be operated most suitably.

An explanation will be given of the operation of the vibration control device 181 of the present embodiment arranged as described above. In the vibration control device 181, when vibration is generated by driving the piezo-actuator 182, the vibration is given to the driving plate 187 of the first liquid lever mechanism 184. Here, the driving plate 187 is allowed to dislocate by virtually the same amount as the amount of displacement of the piezo-actuator 182, and since the contact area of the connecting member 185 to the liquid inside the liquid chamber 186 is smaller than that of the driving plate 187, the displacement of the connecting member 185 is expanded as much as an amount corresponding to the ratio of the two members. In other words, when the ratio of the liquid contact areas of the connecting member 185 and the driving plate 187 is 1:10, the ratio of the displacements of the connecting member 185 and the driving plate 187 is 10:1 (where there is a slight loss in an actual case).

Moreover, the displacement of the connecting member 185, as it is, is given to the driving plate 191 of the second liquid lever mechanism 188 so that the driving plate 191 is allowed to dislocate virtually as much as the same amount as the connecting member 185. However, since the contact area of the action member 189 to the liquid inside the liquid chamber 190 is smaller than that of the driving plate 191, the displacement of the action member 189 is expanded as much as an amount corresponding to the ratio of the two members. In other words, when the ratio of the liquid contact areas of the connecting member 189 and the driving plate 191 is 1:10, the ratio of the displacements of the action member 189 and the driving plate 191 is 10:1 (where there is a slight loss in an actual case). Therefore, in this case, the displacement of the driving plate 187 of the first liquid lever mechanism 184 is expanded to 100 times, and outputted from the action member 189.

In this manner, in accordance with the present embodiment, since the two liquid lever mechanisms 184 and 188 are placed in series with each other, it is possible to expand the displacement of the piezo-actuator 182, and then to externally output it. This arrangement makes it possible to reduce the number of laminated layers of the piezo-element inside the piezo-actuator 182 as compared with conventional arrangements, and consequently to reduce the production costs. Moreover, the vibration control device 181 of the present embodiment can be utilized for applications that require a particularly large displacement, such as a positional control operation and an attitude control operation. Furthermore, in the case when a control target member is a comparatively soft member, the present embodiment can provide a suitable controlling operation on even such a control target member. Additionally, the effects, explained here, can also be obtained in seventeenth to 26th embodiments, which will be described later, in the same manner.

Moreover, as compared with those devices having a mechanical displacement enlarging mechanism such as an arrangement shown in a 23rd embodiment as will be described later, wherein a lever is used, the vibration control device 181 of the present embodiment in which the liquid lever mechanism is used as the displacement enlarging mechanism has a comparatively simpler structure, and is also more preferable from the viewpoint that hardly any high-order vibration modes are exerted in the degree of freedom in the non-rigid inner structure.

<Seventeenth Embodiment>

Figure 18:
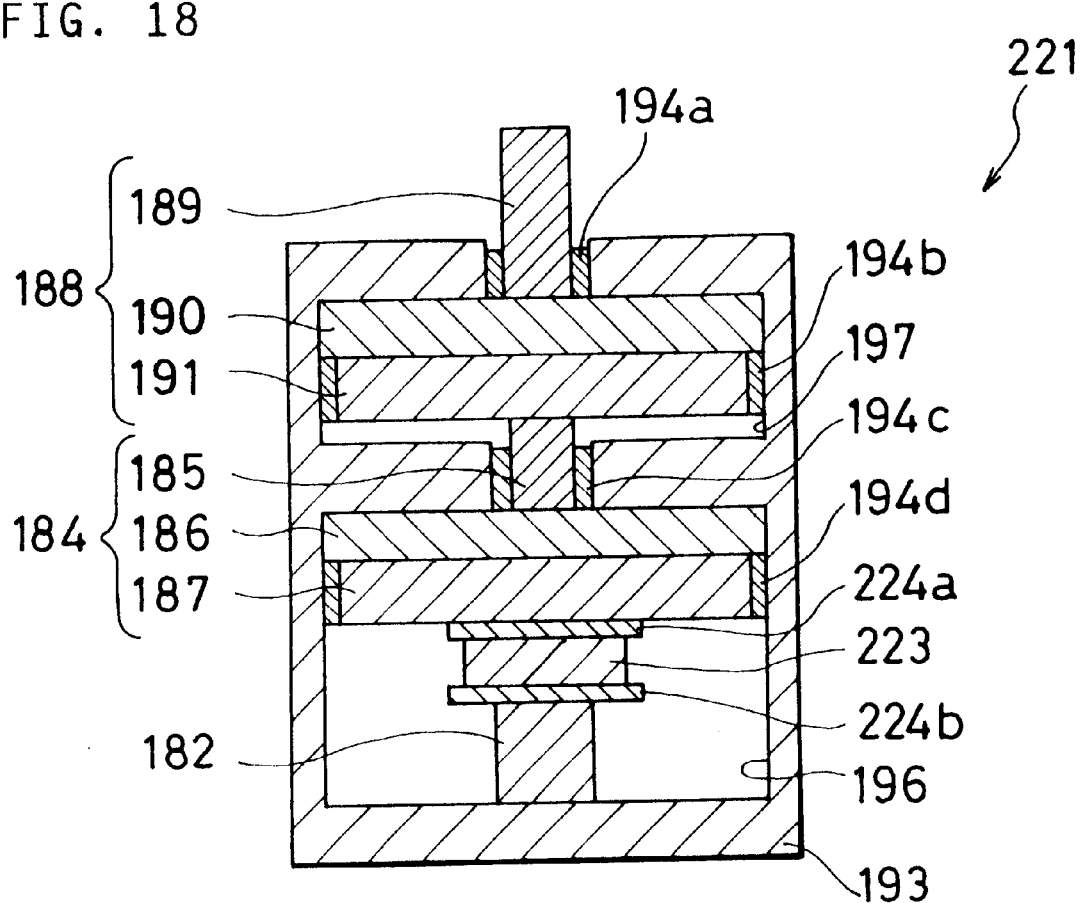
FIG. 18 is a cross-sectional view showing a vibration control device in accordance with a seventeenth embodiment of the present invention.

Next, referring to FIG. 18, the following description will discuss the seventeenth embodiment of the present invention. Here, those members that have the same functions and that are described in the first through sixteenth embodiments are indicated by the same reference numbers and the description thereof is omitted. The vibration control device 221 of the present embodiment is different from the first embodiment in that a rubber vibration isolator 223 is series-aligned between the piezo-actuator 182 and the driving plate 187 of the liquid lever mechanism 184. Moreover, thin rigid plates 224a and 224b, made of, for example, metal or resin, are respectively attached to the two ends of the rubber vibration isolator 223 in the series aligned direction. Since the rigid plates 224a and 224b are placed on both of the ends of the rubber vibration isolator 223, the displacement of the piezo-actuator 182 locally placed can be effectively transmitted to the liquid inside the liquid chamber 186.

In this manner, in the vibration control device 221 of the present embodiment, the two liquid lever mechanisms 184 and 188, the piezo-actuator 182 and the rubber vibration isolator 223 are series-aligned so that, as compared with those having no series-aligned rubber vibration isolator 223, the natural frequency of the vibration control device 221 is made smaller than before. For this reason, it is possible to obtain a superior passive vibration blocking performance at high-frequency areas. Therefore, in accordance with the vibration control device 221 of the present embodiment, it is possible to achieve a vibration control system at comparatively low costs, which can demonstrate a superior active vibration blocking performance with a great displacement at low frequency areas and can also demonstrate a superior passive vibration blocking performance at high frequency areas, while maintaining an advantage of high-speed response with a small capacity that the piezo-actuator 182 possesses. These advantages have not been realized by conventional vibration control devices.

Moreover, in the vibration control device 221 of the present embodiment, the rubber vibration isolator 223 is aligned between the first liquid lever mechanism 184 and the piezo-actuator 182 in series with both of these members; therefore, as compared with the case in which the rubber vibration isolator 223 is placed on the side opposite to the driving plate 187 and the piezo-actuator 182 with respect to the action member 189, it is possible to utilize any rubber vibration isolator having a higher elastic coefficient and a greater displacement as the rubber vibration isolator 223. This arrangement allows the rubber vibration isolator 223 to have a comparatively smaller volume, thereby achieving a rubber vibration isolator 221 having a smaller size.

<Eighteenth Embodiment>

Figure 19:
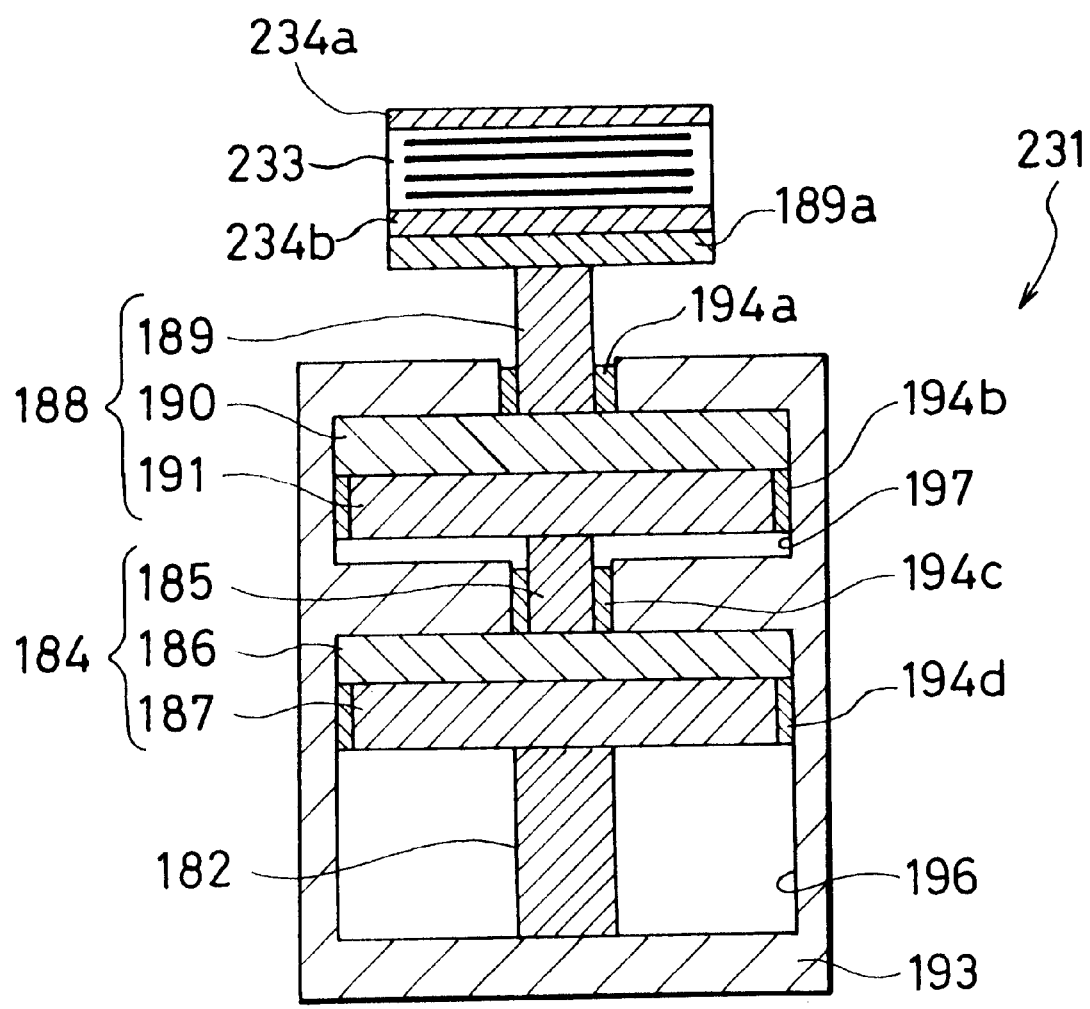
FIG. 19 is a cross-sectional view showing a vibration control device in accordance with an eighteenth embodiment of the present invention.

Next, referring to FIG. 19, the following description will discuss the eighteenth embodiment of the present invention. Here, those members that have the same functions and that are described in the sixteenth embodiment are indicated by the same reference numbers and the description thereof is omitted. The vibration control device 231 of the present embodiment is different from that of the sixteenth embodiment in that a laminated elastic member 233 is placed on a tip portion 189a on the side opposite to the liquid chamber 190 with respect to the action member 189. The laminated elastic member 233 is a non-interference elastic member formed by alternately laminating steel plates (or resin plates or both of these) and elastomer such as rubber cushion. Rigid plates 234a and 234b are placed on both of the ends of the laminated elastic member 233 in the series-alignment direction.

In this manner, in the present embodiment, the laminated elastic member 233 is placed on the tip portion 189a on the side opposite to the liquid chamber 190 with respect to the action member 189 in a manner so as to be series-aligned with the piezo-actuator 182 and the liquid lever mechanisms 184, 188; therefore, even in the case when a shearing force is externally applied in a direction orthogonal to the displacement direction (that is, the series-alignment direction) of the action member 189, the laminated elastic member 233 functions as a cushioning material to the shearing force so that the action member 189 is not subjected to a great shearing force. Therefore, it is possible to prevent damages to the action member 189 effectively. Here, a normal elastic member that has no laminated layers may be used instead of the laminated elastic member 233; however, a non-interference elastic member such as used in the present embodiment will function as the cushioning member to the shearing force more effectively.

<Nineteenth Embodiment>

Figure 20:
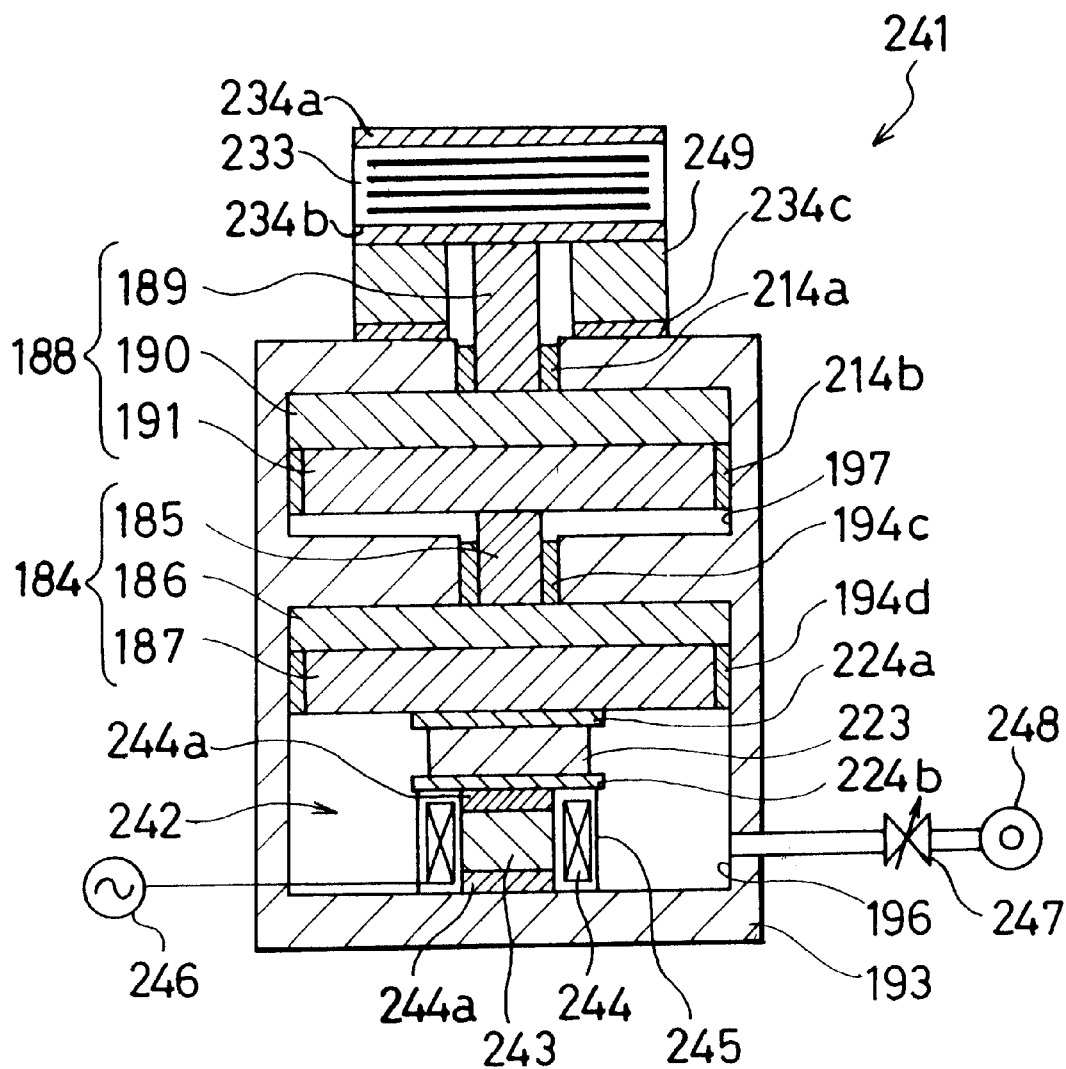
FIG. 20 is a cross-sectional view showing a vibration control device in accordance with a nineteenth embodiment of the present invention.

Next, referring to FIG. 20, the following description will discuss the nineteenth embodiment of the present invention. Here, those members that have the same functions and that are described in the sixteenth to eighteenth embodiments are indicated by the same reference numbers and the description thereof is omitted. In the vibration control device 241 of the present embodiment, instead of the piezo-actuator 182 used in the vibration control devices 181, 221 and 231 in the sixteenth through eighteenth embodiments, a super-magnetostrictive actuator 242 containing a super-magnetostrictive element is used. The super-magnetostrictive actuator 242 is constituted by a super-magnetostrictive rod 243, bias permanent magnets 244a and 244b placed on both of the ends of the vibration displacement direction of the super-magnetostrictive rod 243, and a driving coil 244 that is placed on the side of the super-magnetostrictive rod 243; and these are molded by elastomer 245 into one integral unit. The driving coil 244 is connected to an external driving circuit 246 so that when driven by this, it generates a magnetic field on the super-magnetostrictive rod 243.

Moreover, a vacant section formed in a chamber 196 inside the cylinder case 193 is connected to an air pressure source 248 through an air regulator 247. As described above, in this arrangement, the pressure of the vacant section within the chamber 196 is desirably controlled so that the load applied to the super-magnetostrictive actuator 242 can be adjusted to an optimal value.

Moreover, in the vibration control device 241 of the present embodiment, a laminated elastic member 233 and rigid plates 234a and 234b are series-aligned on the side opposite to the liquid chamber 190 with respect to the action member 189 in the same manner as the eighteenth embodiment, and a rubber vibration isolator 249 and a rigid plate 234c are placed between the rigid plate 234b and the cylinder case 193 in parallel with the action member 189. In the present embodiment, the rubber vibration isolator 249, placed in parallel with the action member 189, shares an externally applied force with the action member 189 so that the load externally applied to the action member 189 is reduced. Therefore, it is possible to carry out a high-precision vibration control operation, and consequently to reduce the vibration damping in the rubber vibration isolator 249; thus, it becomes possible to improve the control efficiency.

<20th Embodiment>

Figure 21:
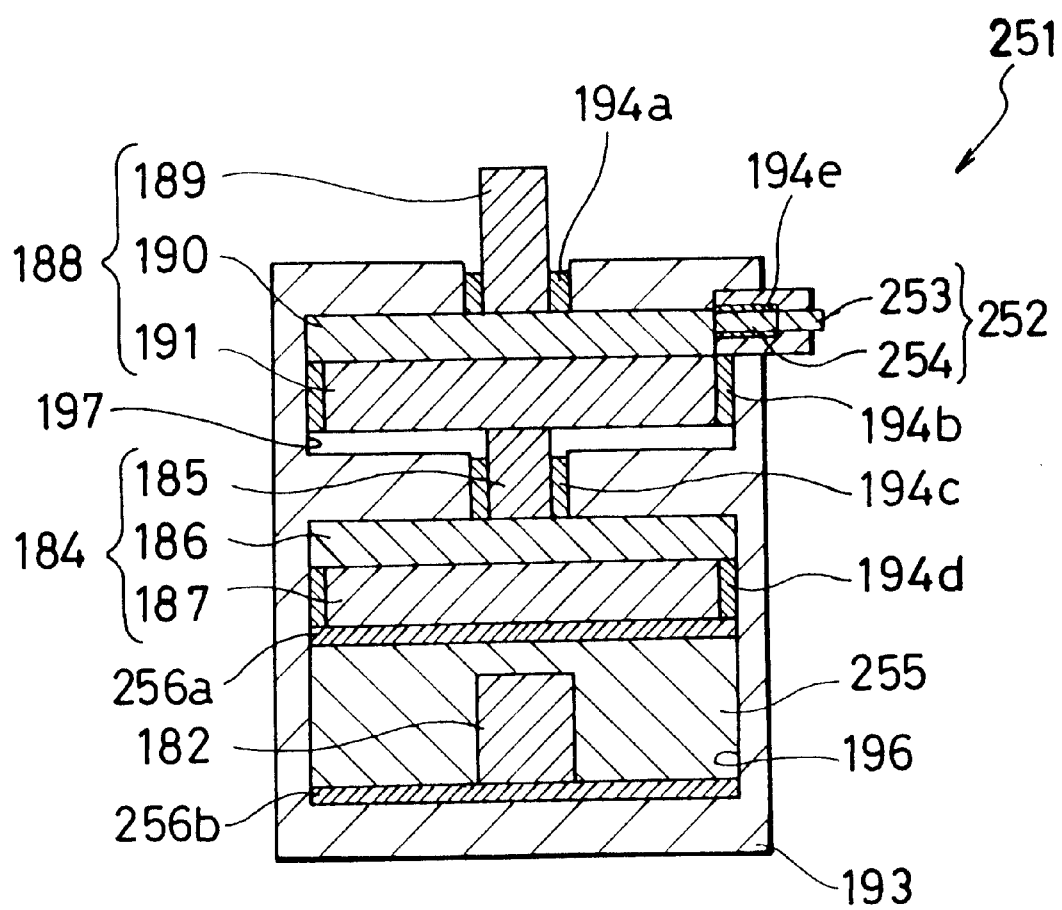
FIG. 21 is a cross-sectional view showing a vibration control device in accordance with a 20th embodiment of the present invention.

Next, referring to FIG. 21, the following description will discuss the 20th embodiment of the present invention. Here, those members that have the same functions and that are described in the sixteenth to nineteenth embodiments are indicated by the same reference numbers and the description thereof is omitted. The vibration control device 251 of the present embodiment is different from the vibration control device 1 of the sixteenth embodiment in that a liquid chamber pressure controlling mechanism 252 for adjusting the pressure inside the liquid chamber 190 of the second liquid lever mechanism 188. The liquid chamber pressure control mechanism 252 is provided with a piston section 254 which is allowed to invade the liquid chamber 190, and a piston-position adjusting section 253 for adjusting the depth of invasion inside the liquid chamber 190 in the piston position 254 in accordance with the back and forth movement, for example, by the rotation of a thread. The periphery of the piston section 254 is sealed by the elastic seal member 194e so that the liquid inside the liquid chamber 190 is free from external leakage.

In the present embodiment, the depth of invasion of the piston section 254 into the liquid chamber 190 is adjusted by the piston position adjusting section 253 so as to control the pressure inside the liquid chamber 190. Therefore, it is possible to easily adjust the level of pressurization applied to the piezo-actuator 182.

Moreover, in the vibration control device 251 of the present embodiment which is a modified example of the vibration control device 221 of the seventeenth embodiment, the shape of the rubber vibration isolator is changed so that a rubber vibration isolator 255 is placed in series with as well as in parallel with the piezo-actuator 182, and rigid plates 256a and 256b are attached to both of the ends of the rubber vibration isolator 255. With this arrangement, the optimal operation controlling process for the piezo-actuator 182, which has been carried out by adjusting the air spring in the sixteenth through nineteenth embodiments, can be carried out by using the parallel-aligned portion of the rubber vibration isolator 255. This makes it possible to eliminate the necessity of the valve and compressor that need to be connected to the air spring in the case of the nineteenth embodiment, thereby simplifying the device structure. Moreover, since the rubber vibration isolator 255 seals the piezo-actuator 182 from outside air, it becomes possible to shield the piezo-actuator 182 from influences of outside humidity, and consequently to ensure a long service life of the piezo-actuator 182. Here, the series-aligned portion and the parallel-aligned portion of the rubber vibration isolator 255 are not necessarily provided as an integrally molded member, and may be provided as separated portions.

<21st Embodiment>

Figure 22:
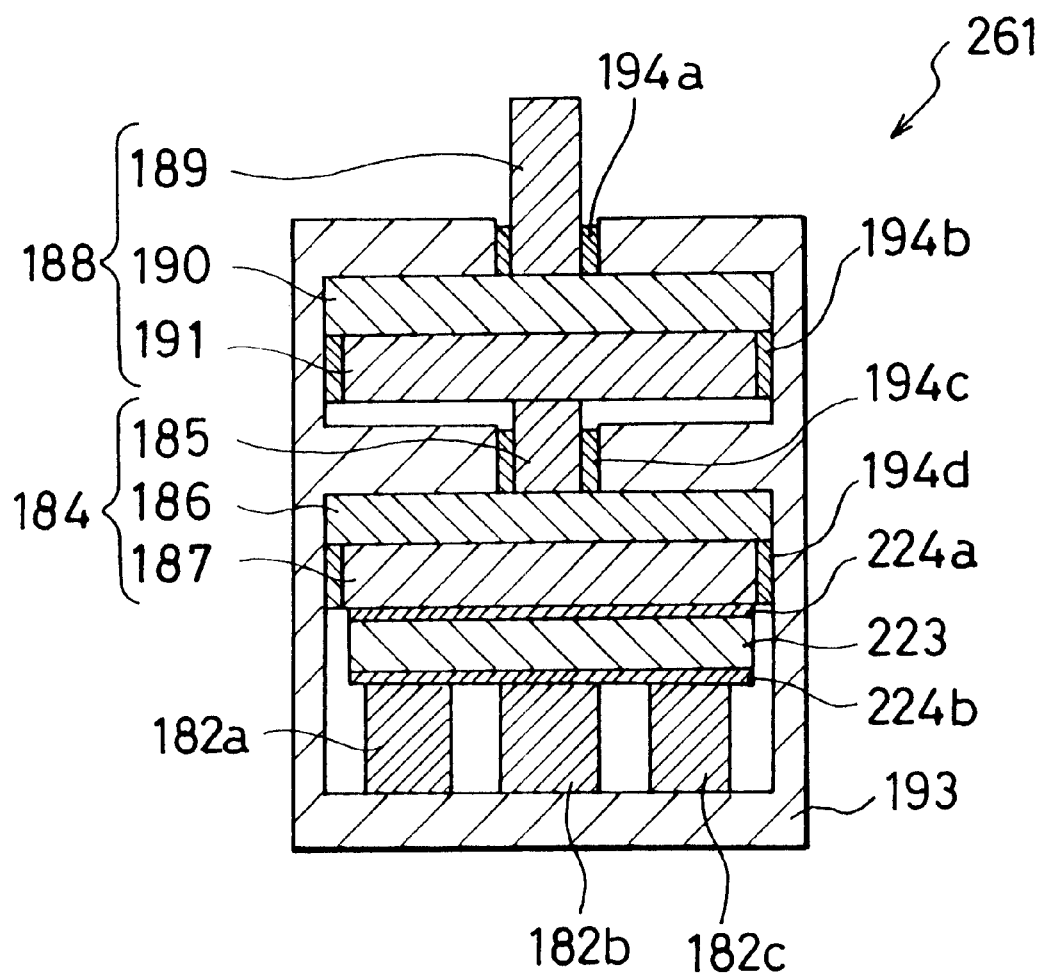
FIG. 22 is a cross-sectional view showing a vibration control device in accordance with a 21st embodiment of the present invention.
Figure 23:
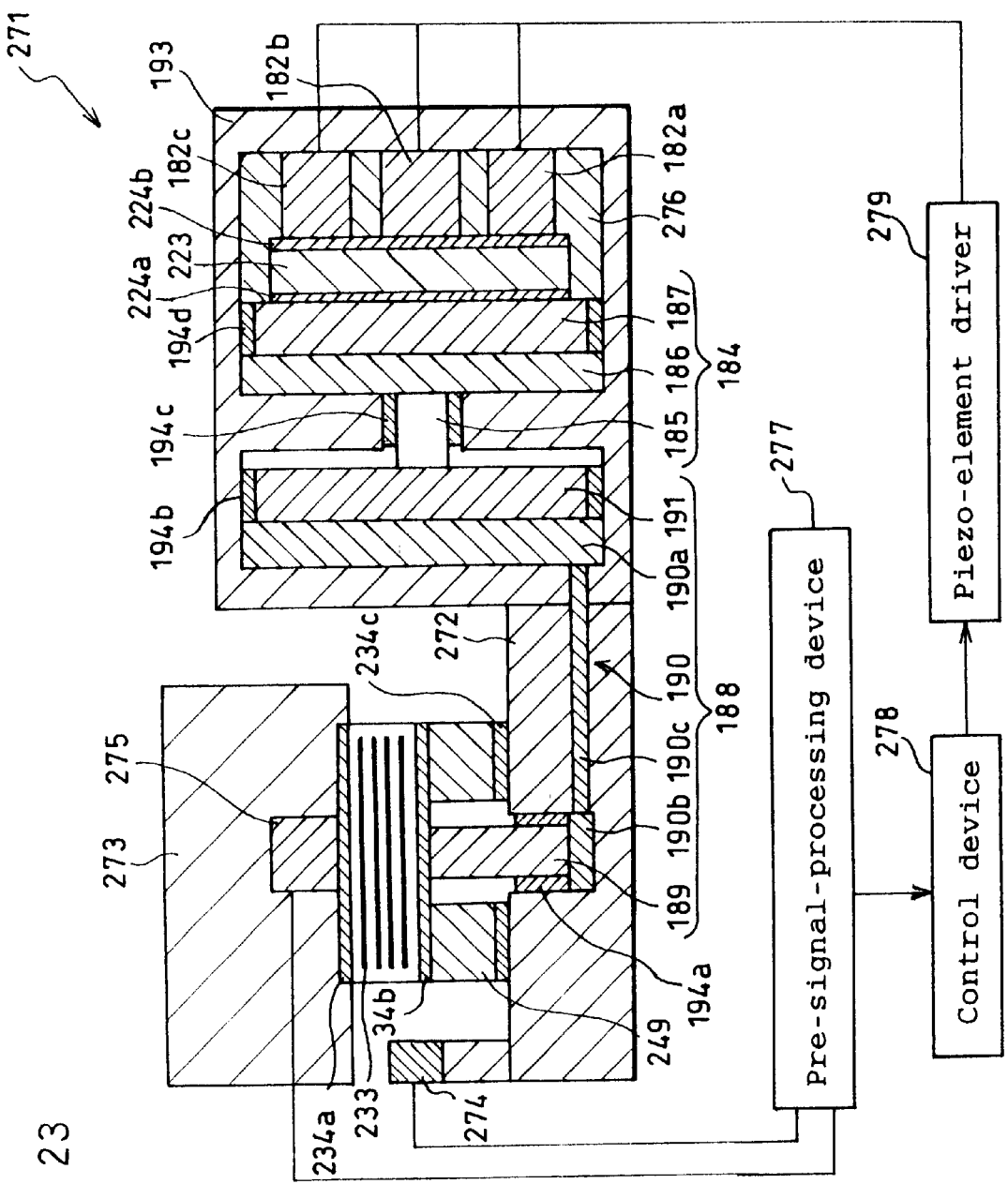
FIG. 23 is a cross-sectional view showing a vibration control device in accordance with a 22nd embodiment of the present invention.

Next, referring to FIG. 22, the following description will discuss the 21st embodiment of the present invention. Here, those members that have the same functions and that are described in the sixteenth to 20th embodiments are indicated by the same reference numbers and the description thereof is omitted. In the vibration control device 261 of the present embodiment which has a modified structure of the vibration control device 221 of the seventeenth embodiment, the single piezo-actuator 182 is replaced by three piezo-actuators 182a, 182b and 182c that are aligned parallel to each other in a manner so as to be separated from each other. The three piezo-actuators 182a, 182b and 182c are driven in synchronism with each other in accordance with signals from a driving section, not shown. Thus, the vibration control device 261 of the present embodiment is allowed to generate a greater controlling force.

<22nd Embodiment>

Referring to FIG. 22, the following description will discuss the 22nd embodiment of the present invention. Here, those members that have the same functions and that are described in the sixteenth through 21st embodiments are indicated by the same reference numbers and the description thereof is omitted. In the present embodiment, an explanation will also be given of a driving method of a vibration control device that is executed when a vibration generation process or a vibration controlling process is applied to a controlling target member coupled to the vibration control device. Here, the driving method of the vibration control device to be explained in the present embodiment is applicable to the vibration control devices of the other embodiments in the same manner.

In a vibration control device 271 of the present embodiment, a liquid chamber 190, which constitutes one portion of a liquid lever mechanism 188, is divided into a first liquid chamber 190a placed inside a cylinder case 193, a second liquid chamber 190b placed on a lower face plate 272 on which the action member 189 is installed and a pipe 190c connecting the two chambers. Moreover, the peripheral portion of the action member 189 is sealed with an elastic seal member 194a so that a force applied from the action member 189 is transmitted to an upper face plate 273 that is a control target member, through a laminated elastic member 233. A sensor 274 for measuring the distance from the upper face plate 273 is placed on the lower face plate 272, and a sensor 275 for measuring the vibration acceleration is placed on the upper face plate 273. Moreover, inside the cylinder case 193, piezo-actuators 182a, 182b and 182c, molded by elastomer 276, a rubber vibration isolator 223, a first liquid lever mechanism 184, and a driving plate 191 of a second liquid lever mechanism 188 and a first liquid chamber 190a are aligned in series with each other, and housed. The detection signals obtained from the sensors 274 and 275 are supplied to a pre-signal-processing device 277. Based upon signals from the pre-signal-processing device 277, a control device 278 finds control signals to be supplied to the piezo-actuators 182a, 182b and 182c. Then, in accordance with the control signals, the respective piezo-actuators 182a, 182b and 182c are driven by a piezo-element driver 279.

In this manner, in the vibration control device 271 of the present embodiment, the two liquid chambers 190a and 190b are connected by the pipe 190c so that the installation places of the piezo-actuators 182a, 182b, 182c and the installation place of the action member 189 can be separated with a desired distance corresponding to the length of the pipe 190c. Moreover, in the sixteenth through the 21st embodiments, the displacement direction of the driving plate 187 and the displacement direction of the action member 189 are always the same; however, in the present embodiment, these directions are rotated by 90° from each other. In other words, the application of the first and second liquid lever mechanisms 184 and 188 makes it possible to desirably select which direction the force is exerted in. Therefore, the piezo-actuators 182a, 182b and 182c are installed at positions where they are easily maintenanced, while the action member 189 can be placed far apart from the piezo-actuators 182a, 182b and 182c; thus, the action member 189 can be oriented in a manner indifferent from the attitudes of the piezo-actuators 182a, 182b and 182c.

Next, an explanation will be given of a driving method for the vibration control device 271 of the present embodiment. In the case when desired vibration is generated on the upper face plate 273, first, the vibration signal of the upper face plate 273 is measured by the sensor 275 with respect to the displacement direction (in this case, vertical direction) of the action member 189. Then, based upon the vibration signal, a feed-back control is carried out so that a driving signal, which allows the upper face plate 273 to exert predetermined vibration, is generated by the control device 278 and the driver 279. Thus, this driving signal is used for driving the piezo-actuators 182a,182b and 182c. Such a controlling process allows the upper face plate 273, which is a control target member, to exert the desired vibration. Moreover, in the case when the vibration of the upper face plate 273 is suppressed, the vibration control device 271 may be driven in the same manner.

Moreover, the controlling process may be carried out by also utilizing a displacement signal from the sensor 274. In other words, the relative displacement of the upper face plate 273 is detected by the sensor 274 so that the relative positional error from the target position of the upper face plate 273 is found by the control device 278. Then, in order to allow the upper face plate 273 to trace the target position, electric signals to be applied to the piezo-actuators 182a, 182b and 182c are controlled by the control device 278. Such a controlling process makes it possible to maintain the distance between the upper face plate 273 and the lower face plate 272 at an appropriate distance.

Moreover, in the present embodiment, a voltage supply is cut off from any of the piezo-actuators 182a, 182b, 182c that has been damaged. This arrangement makes it possible to prevent wasteful power consumption, and consequently to achieve a reduction in the power consumption in the driving process. For this reason, the respective piezo-actuators 182a, 182b and 182c are provided with sensors (not shown) that are used for damage detection, and detection signals from these sensors are supplied to the control device 278.

<23rd Embodiment>

Figure 24:
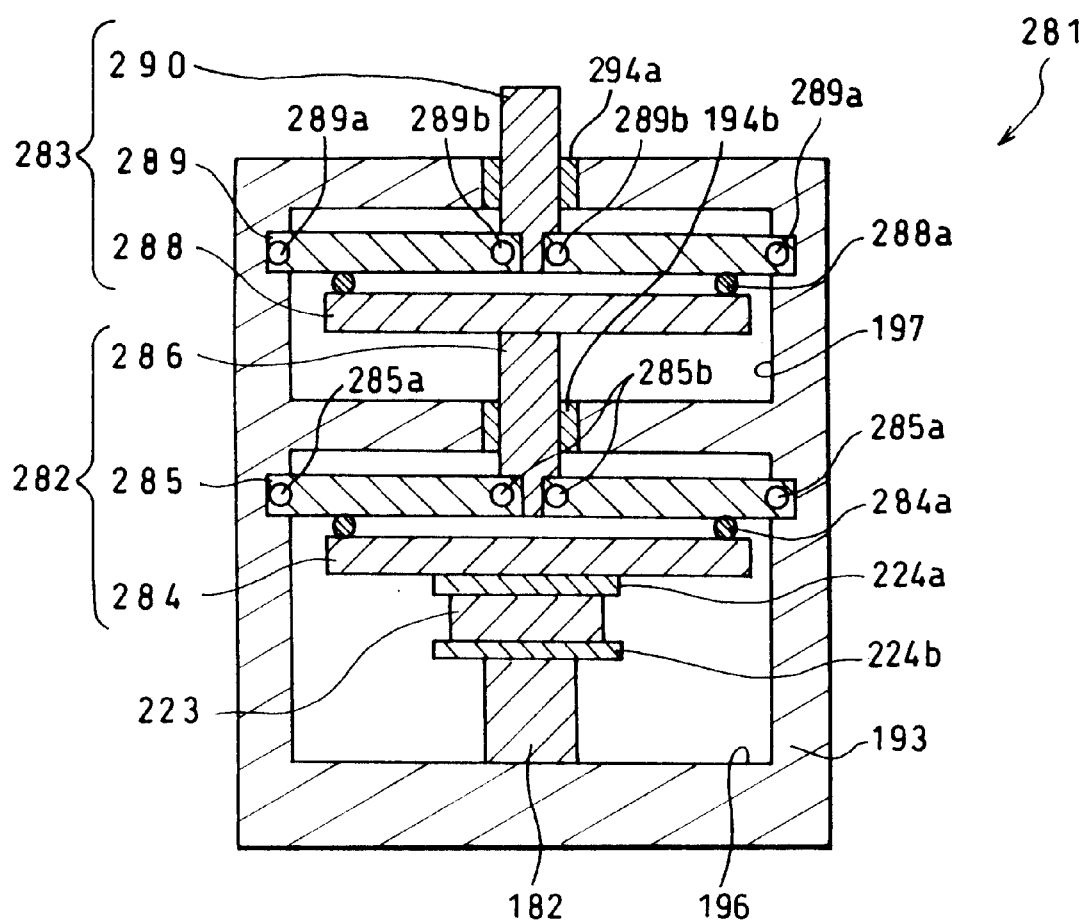
FIG. 24 is a cross-sectional view showing a vibration control device in accordance with a 23rd embodiment of the present invention.

Next, referring to FIG. 24, the following description will discuss the 23rd embodiment of the present invention. Here, those members that have the same functions and that are described in the sixteenth through 22nd embodiments are indicated by the same reference numbers and the description thereof is omitted. In the vibration control device 281 of the present embodiment, instead of the first and second liquid lever mechanisms 184 and 188 which are used in the sixteenth to 22nd embodiments, first and second mechanical lever mechanisms 282 and 283 are placed in series with each other.

The first mechanical lever mechanism 282, housed inside a chamber 196, is constituted by a driving plate 284 placed on the rubber vibration isolator 223 side, a lever 285 for enlarging the displacement of the driving plate 284 as will be described later, a connecting member 286 placed on the side opposite to the driving plate 284 with respect to the lever 285. One end of the connecting member 286 on the side opposite to the lever 285 is allowed to protrude toward the chamber 197 side through a hole formed in the cylinder case 193. The lever 285, one end 285a of which is connected to the cylinder case 193 so as to freely pivot thereon, has the other end 285b connected to the connecting member 286 so as to freely pivot thereon. Moreover, the lever 285 is supported by the driving plate 284 in a manner so as to contact a support section 284a placed on the driving plate 284 with a comparatively small area.

Moreover, the second mechanical lever mechanism 283, housed inside a chamber 197, is constituted by a driving plate 288 connected to the connecting member 286 of the first mechanical lever mechanism 282, a lever 289 for enlarging the displacement of the driving plate 288 as will be described later, and an action member 290 placed on the side opposite to the driving plate 288 with respect to the lever 289. One end of the action member 290 on the side opposite to the lever 289 is allowed to protrude outside through a hole formed in the cylinder case 193. The lever 289, one end 289*a* of which is connected to the cylinder case 193 so as to freely pivot thereon, has the other end 289*b* connected to the action member 290 so as to freely pivot thereon. Moreover, the lever 289 is supported by the driving plate 288 in a manner so as to contact a support section 288*a* placed on the driving plate 288 with a comparatively small area.

In the vibration control device 281 of the present embodiment arranged as described above, when vibration is generated by driving the piezo-actuator 182, the vibration is given to the driving plate 284 of the first mechanical lever mechanism 282 through the rubber vibration isolator 223. When the driving plate 284 is displaced up and down, the lever 285 to which a force has been applied from the support section 284*a* is allowed to pivot centered on the end 285*a*, with the result that the connecting member 286 is displaced up and down in the Figure. In this case, (the displacement of the connecting member 286:the displacement of the driving plate 284) is equal to (the distance between the two ends 285*a* and 285*b* of the lever 285:the distance between the end 285*a* of the lever 285 and the support section 284*a* thereof), and the displacement of the connecting member 286 is enlarged greater than the displacement of the driving plate 284. In the same manner, in the second mechanical lever mechanism 283 also, the displacement, inputted from the driving plate 288 through the connecting member 286, is enlarged, and outputted from the action member 290.

In this manner, in accordance with the present embodiment, since the first and second mechanical lever mechanisms 282 and 283 are installed, it is possible to expand the displacement of the piezo-actuator 182, and then to externally output it. This arrangement makes it possible to reduce the number of laminated layers of the piezo-element inside the piezo-actuator 182 as compared with conventional arrangements, and consequently to greatly reduce the production costs. Moreover, in the vibration control device 281 of the present embodiment, the first and second mechanical lever mechanisms 282, 283, the piezo-actuator 182 and the rubber vibration isolator 223 are placed in series with each other; therefore, as compared with the case in which the rubber vibration isolator 223 is not series-aligned, the natural frequency of the vibration control device 281 becomes lower than that of conventional devices. For this reason, it is possible to obtain a superior passive vibration blocking performance at high-frequency areas. Moreover, the miniaturization of the rubber vibration isolator 223 makes it possible to provide a vibration control device 281 having a compact structure.

<24th Embodiment>

Figure 25:
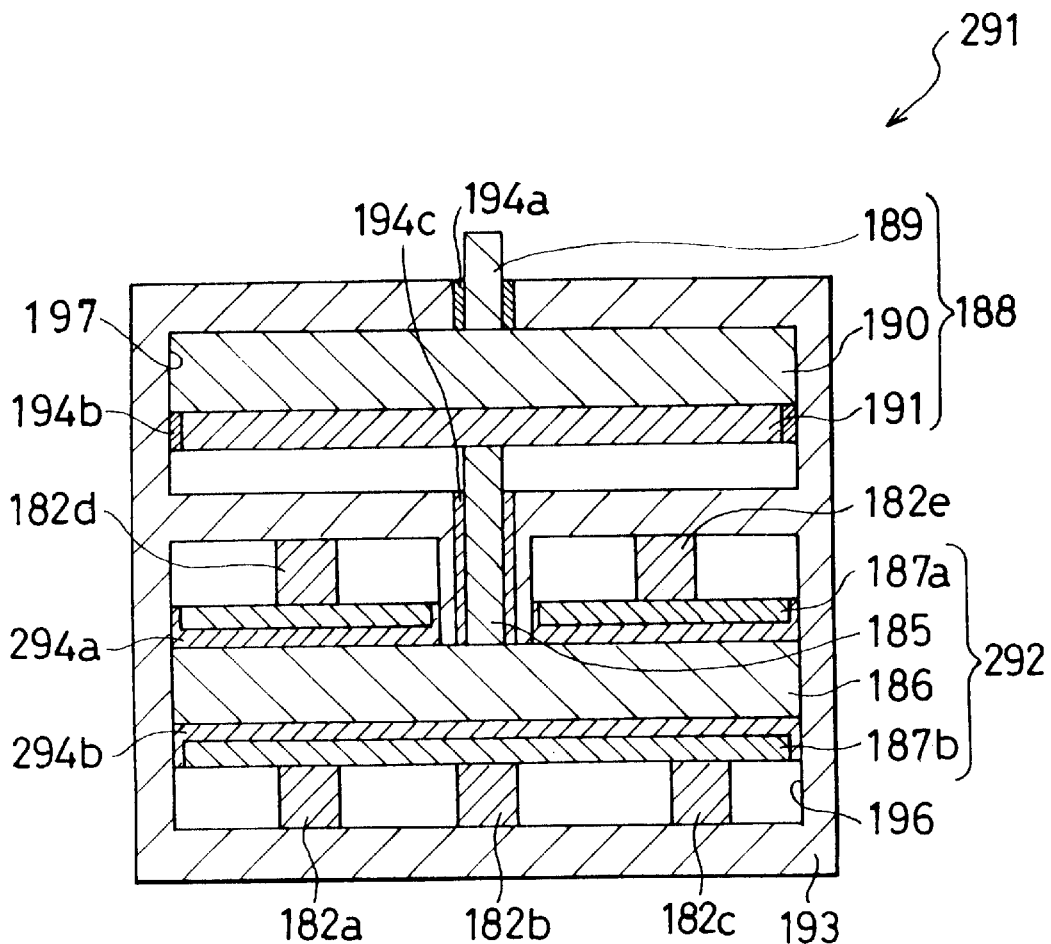
FIG. 25 is a cross-sectional view showing a vibration control device in accordance with a 24th embodiment of the present invention.

Next, referring to FIG. 25, the following description will discuss the 24th embodiment of the present invention. Here, those members that have the same functions and that are described in the sixteenth through 23rd embodiments are indicated by the same reference numbers and the description thereof is omitted. In the vibration control device 291 of the present embodiment, inside a chamber 196, driving plates 187*a* and 187*b* as well as five piezo-actuators 182*a* to 182*e* are aligned face to face with each other vertically with the liquid chamber 186 sandwiched in between. Here, the first liquid lever mechanism 292 is provided with the liquid chamber 186, the driving plates 187*a* and 187*b* and a connecting member 185 placed in the center of the driving plate 187*a*. The driving plate 187*a* is driven by the piezo-actuators 182*d* and 182*e*, and the driving plate 187*b* is driven by the piezo-actuators 182*a*, 182*b* and 182*c*.

Moreover, rubber vibration isolators 294*a* and 294*b* are respectively placed between the driving plate 187*a* and the liquid chamber 186 as well as between the driving plate 187*b* and the liquid chamber 186. The rubber vibration isolators 294*a* and 294*b* function so as to seal the liquid chamber 186, thereby preventing the liquid from leaking. Moreover, the rubber vibration isolators 294*a*, 294*b* allow the natural frequency of the vibration control device 291 to reduce, thereby making it possible to exert a superior passive vibration blocking performance at high frequency bands, in the same manner as the rubber vibration isolator 223 of the second embodiment. Moreover, with respect to the rubber vibration isolators 294*a* and 294*b*, those which are hard and have a high elastic coefficient can be used, as compared with the case in which they are placed outside (on the side opposite to the liquid chamber 186 with respect to the driving plates 187*a* and 187*b*) the connecting member 185; therefore, the volumes of the rubber vibration isolators 294*a* and 294*b* are made smaller so that the vibration control device 291 is allowed to have a compact structure.

Moreover, in the present embodiment, upon application to the cylinder case 193 from the first liquid lever mechanism 292, hardly any operational force is externally released, and the operational forces, generated on the piezo-actuators 182*a* through 182*e*, can be given to the action member 185 at a higher rate, thereby making it possible to operate the piezo-actuators 182*a* through 182*e* at a higher efficiency. Moreover, in the present embodiment, a number of piezo-actuators 182*a* through 182*e* are aligned face to face with each other; thus, it is also possible to place comparatively many piezo-actuators within a narrow flat face, and consequently to obtain a greater operational force.

<25th Embodiment>

Figure 26:
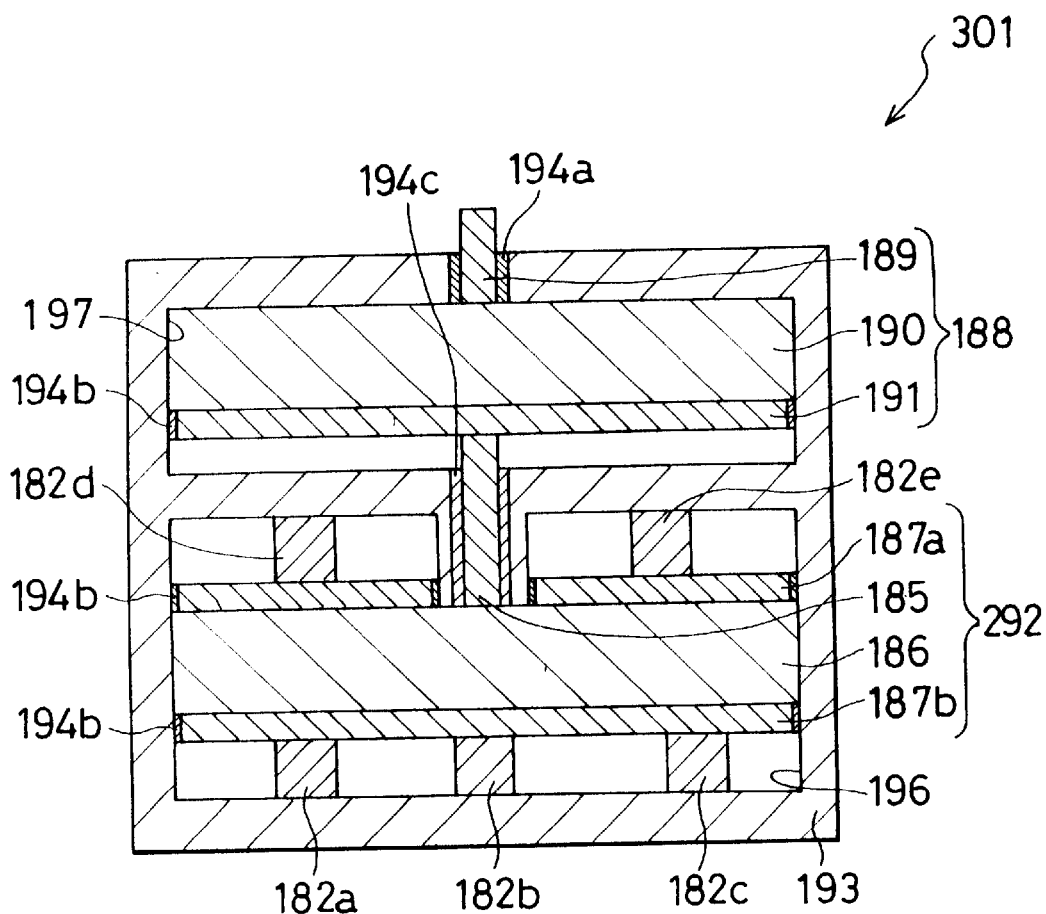
FIG. 26 is a cross-sectional view showing a vibration control device in accordance with a 25th embodiment of the present invention.

Next, referring to FIG. 26, the following description will discuss the 25th embodiment of the present invention. Here, those members that have the same functions and that are described in the sixteenth through 24th embodiments are indicated by the same reference numbers and the description thereof is omitted. The vibration control device 301 of the present embodiment is different from that of the 24th embodiment in that an elastic seal member 194*b* is placed instead of the rubber vibration isolators 294*a* and 294*b*, and in that a liquid in which a number of small particles that are elastically variable in their volumes are dispersed is used as the liquid inside the liquid chambers 186 and 190. With respect to the number of small particles that are elastically variable in their volumes, for example, a resin containing gas sealed therein and an elastomer powdered material may be used.

In the present embodiment, the many particles dispersed in the liquid chambers 186 and 190 function in the same manner as an elastic member so that it is possible to obtain the same effects as those of the aforementioned 24th embodiment without the need of installing elastic members such as rubber vibration isolators outside the liquid chambers 186 and 190 of the first and second liquid lever mechanisms 292, 188. Therefore, it is possible to make the vibration control device 301 more compact while maintaining the above-mentioned effects.

<26th Embodiment>

Figure 27:
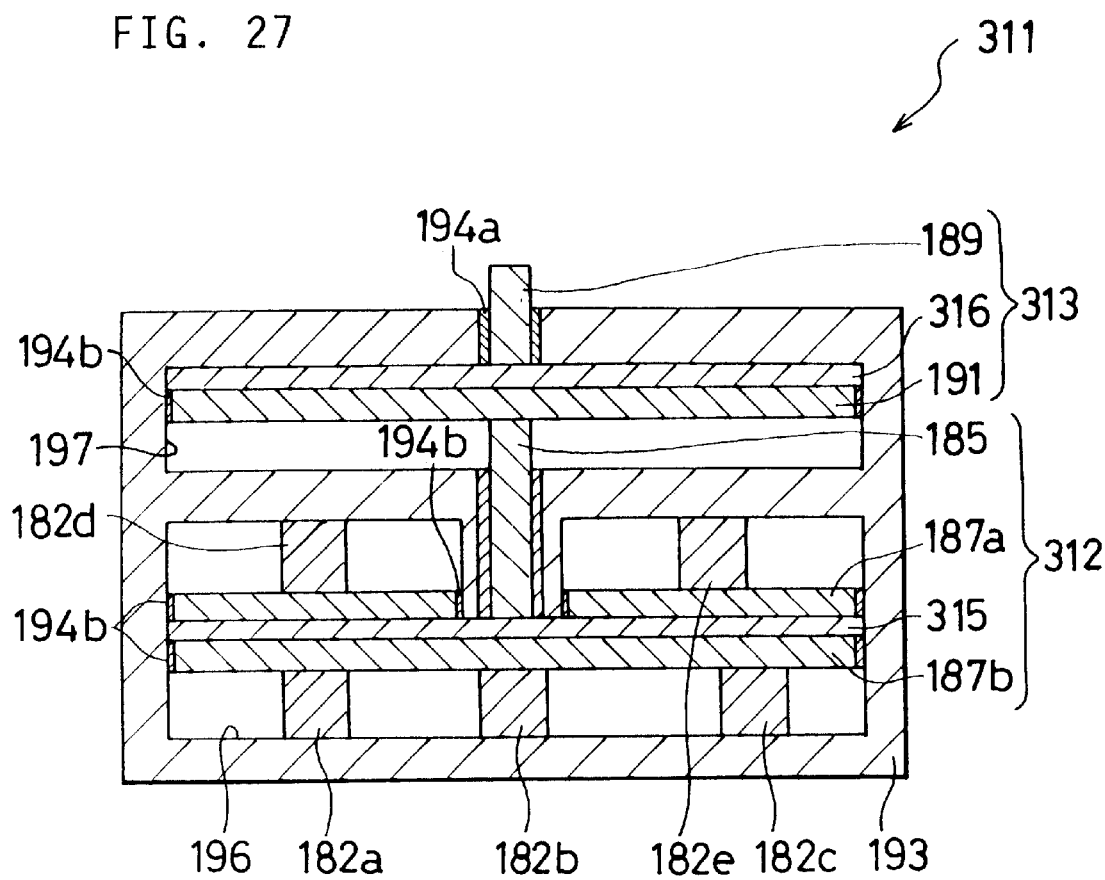
FIG. 27 is a cross-sectional view showing a vibration control device in accordance with a 26th embodiment of the present invention.

Next, referring to FIG. 27, the following description will discuss the 26th embodiment of the present invention. Here, those members that have the same functions and that are described in the 16th through 25th embodiments are indicated by the same reference numbers and the description thereof is omitted. The vibration control device 311 of the present embodiment is different from that of the 25th embodiment in that first and second gas lever mechanisms 312 and 313 are used instead of the first and second liquid lever mechanisms 292 and 188. The first air lever mechanism 312, housed in the chamber 196, is provided with a gas chamber 315 which has a very narrow width with a narrowed distance between the upper and lower driving plates 187a and 187b as compared with the liquid chambers 186 and 190 used in the other embodiments. Moreover, the second air lever mechanism 313, housed in the chamber 197, also has a gas chamber 316 having a narrow width in the same manner.

The air chambers 315 and 316 of the air lever mechanisms 312 and 313 having the above-mentioned structure function as elastic members so that, with the present embodiment, it becomes possible to obtain the same effects as those of the 25th and 26th embodiments. Moreover, the air lever mechanisms 312 and 313 have a smaller size than the liquid lever mechanism used in the above-mentioned embodiments, and eliminate the necessity of further placing elastic members outside thereof; therefore, it is possible to provide a very compact vibration control device.

<27th Embodiment>

Figure 28:
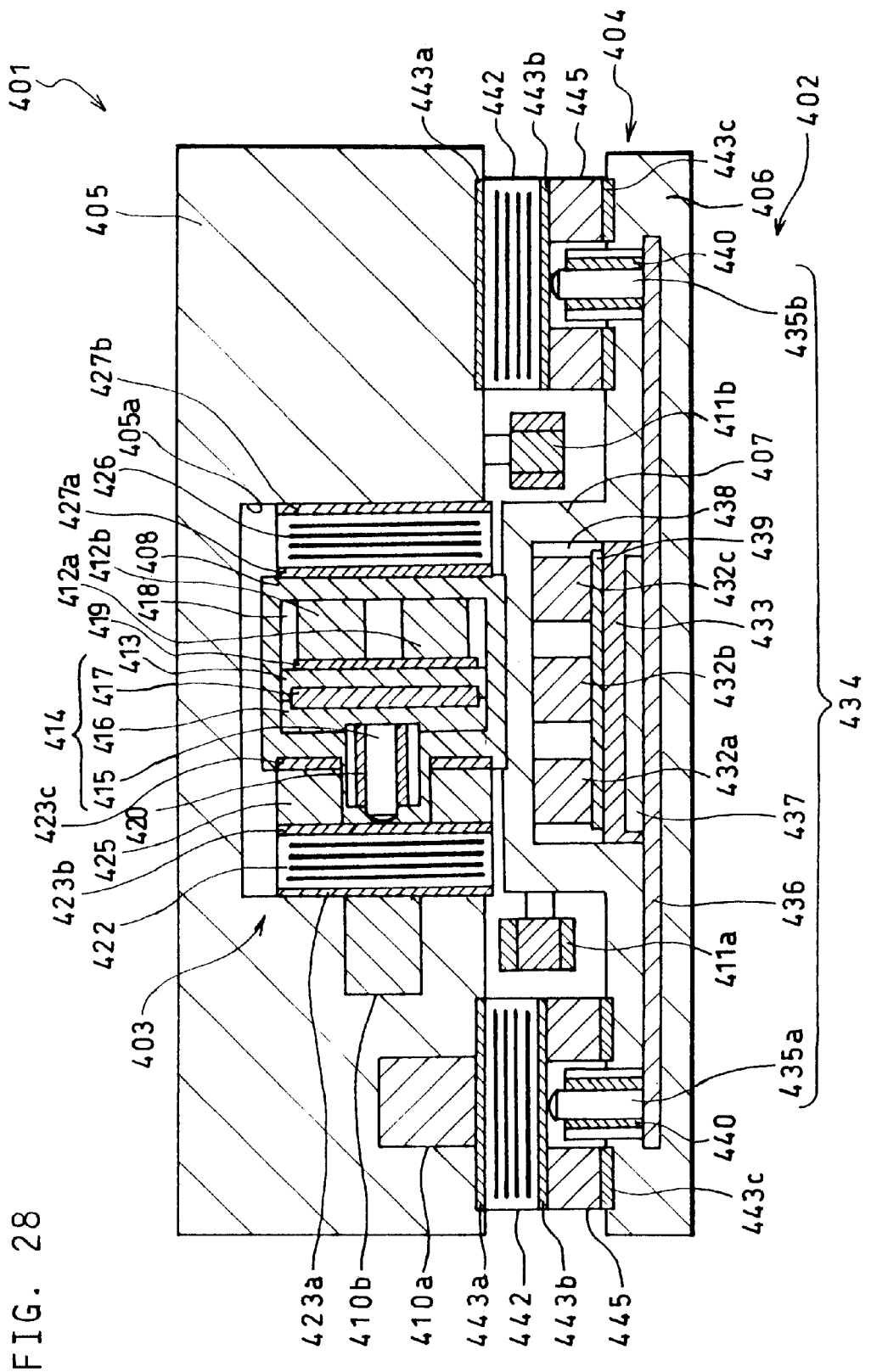
FIG. 28 is a cross-sectional view showing a vibration control device in accordance with a 27th embodiment of the present invention.

Next, referring to FIG. 28, the following description will discuss the 27th embodiment of the present invention. As illustrated in FIG. 28, a vibration control structure 401 in the present embodiment uses a lower-portion assembly 404 in which two vibration control devices 402 and 403 have been incorporated, so as to carry out a vibration control operation on a upper face plate 405 that is a control target member. The two vibration control devices 402 and 403 are arranged so that respective action members 435a, 435b; 415, which will be described later, have vertical and horizontal displacement directions (in the present embodiment, the displacement direction of the action member and the action direction are the same). For this reason, the upper face plate 405 is subjected to vibration controlling operations independently in two directions, that is, the horizontal direction and the vertical direction. Here, the lower-portion assembly 404 refers to collective unit including the lower face plate 406, a cylinder case 407 and a cylinder case 408. The vibration control device 402 is formed inside and in the vicinity of the lower face plate 406 and the cylinder case 407, and the vibration control device 403 is formed inside and in the vicinity of the cylinder case 408 placed on the cylinder case 407, and is inserted to a concave section 405a formed on the lower face side of the upper face plate 405.

Moreover, on the upper face plate 405, sensors 410a and 410b for respectively measuring the vibration accelerations in the vertical and horizontal directions are placed on the extended lines of the displacement directions of the respective action members of the vibration control devices 402 and 403. Furthermore, a sensor 411a for measuring the separating distance in the vertical direction from the bottom face of the upper face plate 405 is placed on a side face of the cylinder case 407, and a sensor 411b for measuring the separating distance in the horizontal direction from the side face of the cylinder case 407 is placed on the bottom face of the upper face plate 405. Detection signals from the sensors 410a and 411a are given to a control device through a pre-signal processing device (both of which are not shown), so as to control the piezo-actuators 412a and 412b of the vibration control device 402. In the same manner, detection signals from the sensors 410b and 411b are given to a control device through a pre-signal processing device so as to control the piezo-actuators 432a, 432b and 432c of the vibration control device 403. In this manner, in the present embodiment, based upon the detection signals from the sensors 410a, 410b, 411a and 411b, the vibration control devices 402 and 403 are controlled so that it is possible to carry out the vibration control operation of the upper face plate 405 more accurately.

Next, an explanation will be given of the structure of the vibration control device 403. In the vibration control device 403, the two piezo-actuators 412a and 412b, each containing piezo-element, placed in parallel with each other, a rubber vibration isolator 413 serving as an elastic member and a liquid lever mechanism 414 serving as a displacement enlarging mechanism are placed in series with each other in the cylinder case 408. The liquid lever mechanism 414 is provided with a liquid chamber 416 in which liquid is sealed, a driving plate 417 placed between the liquid chamber 416 and the rubber vibration isolator 413 so as to contact the liquid inside the liquid chamber 416 and an action member 415 placed on the side opposite to the driving plate 417 with respect to the liquid chamber 416 so as to contact the liquid inside the liquid chamber 416. The liquid inside the liquid chamber 416 is sealed by an elastic seal member 420 placed along the action member 415 on the action member 415 side, and is also sealed by the rubber vibration isolator 413 on the driving plate 417 side.

The piezo-actuators 412a and 412b, placed side by side, have their peripheral portions coated and molded with elastomer 418. Thus, since the piezo-actuators 412a and 412b are blocked from outside air, it becomes possible to shield the piezo-actuators 412a and 412b from influences of outside humidity, and consequently to ensure a long service life of the piezo-actuators 412a and 412b. Additionally, instead of the elastomer 418, another elastic member, such as gel, may be used. Moreover, FIG. 28 shows a state in which the gap between the two piezo-actuators 142a and 142b is filled with the elastomer 418; however, the elastomer 418 may be placed as a portion coating the piezo-actuator 412a and a portion coating the piezo-actuator 412b in a separated manner.

A rigid plate 419 is placed between the rubber vibration isolator 413 and the piezo-actuators 412a and 412b. The application of the rigid plate 419 between the rubber vibration isolator 413 and the piezo-actuators 412a and 412b makes it possible to uniformly transmit the displacements of the piezo-actuators 412a and 412b locally placed to the liquid inside the liquid chamber 416 efficiently.

The contact area of the action member 415 to the liquid inside the liquid chamber 416 is smaller than that of the driving plate 417 thereto. One end of the action member 415 on the side opposite to the liquid chamber 416 is exposed to outside through a hole formed in the cylinder case 418. Since the piezo-actuators 412a and 412b, the rubber vibration isolator 413 and the liquid lever mechanism 414 are housed inside the cylinder case 408, it is possible to provide a vibration control device 403 having a small size, and consequently to save space.

The piezo-actuators 412a and 412b are allowed to vibrate slightly based upon electric signals supplied thereto from a driver, not shown, in accordance with the above-mentioned controlling operation by the control device. The direction of the vibration is set to the same direction as the direction in which the piezo-actuators 412a, 412b, the rubber vibration isolator 413 and the liquid lever mechanism 414 are series-aligned (that is, the horizontal direction).

A laminated elastic member 422 is series-aligned between the action member 415 and one side face of the concave section 405a of the upper face plate 405. The laminated elastic member 422 is a non-interference elastic member formed by alternately laminating steel plates (or resin plates or both of these) and cushion rubber such as elastomer. Rigid plates 423a and 423b are respectively placed at both of the ends of the laminated elastic member 422 in the series-alignment direction. Moreover, a rubber vibration isolator 425 and a rigid plate 423c are placed between the rigid plate 423b and the cylinder case 408 in parallel with the action member 415.

Moreover, a laminated elastic member 426 is series-aligned between the cylinder case 408 and the other opposing side face of the concave section 405a of the upper face plate 405. The laminated elastic member 426 is a non-interference elastic member formed by alternately laminating steel plates (or resin plates or both of these) and cushion rubber such as elastomer. Rigid plates 427a and 427b are respectively placed at both of the ends of the laminated elastic member 426 in the series-alignment direction.

The length from the rigid plate 423a to the rigid plate 427b is set to be slightly longer than the distance between the opposing side faces of the concave section 405a, with the result that, in a state where the vibration control device 403 is inserted to the concave section 405a, an appropriate pressurization is applied to the vibration control device 403.

In this manner, in the present embodiment, on the action member 415 on the side opposite to the liquid chamber 416 is placed a laminated elastic member 422 that is aligned in series with the piezo-actuators 412a and 412b and the liquid lever mechanism 414 so that, in the case when a shearing force is externally applied in a direction orthogonal to the displacement direction (that is, in the series alignment direction) of the action member 415, the laminated elastic member 422 serves as a cushioning member against the shearing force so as to reduce the shearing force to be applied to the action member 415, thereby effectively preventing damages to the action member 415. In particular, in the case of the present embodiment, the vibration control device 402 generates vibration in the vertical direction, and this is imposed on the action member 415; therefore, the function of the laminated elastic member 422 is very important. Moreover, in the present embodiment, the cylinder case 408 is placed in series with the two laminated elastic members 422 and 426 in a manner so as to be sandwiched with these members; therefore, it is possible to effectively prevent the action member 415 from being damaged. Here, the laminated elastic members 422 and 426 may be normal elastic members that are not laminated; however, the laminated non-interference elastic members as in the case of the present embodiment function as a cushion member against the shearing force more effectively.

Moreover, in the present embodiment, the rubber vibration isolator 425, placed in parallel with the action member 415, shares an externally applied force with the action member 415 so as to reduce the externally applied load onto the action member 415. Therefore, it is possible to carry out a vibration controlling operation with higher precision, and the control efficiency increases as the vibration damping in the rubber vibration isolator 425 decreases.

An explanation will be given of the operation of the vibration control device 403 having the above-mentioned arrangement. In the vibration control device 403, when vibration occurs by driving the piezo-actuators 412a and 412b, the vibration is given to the driving plate 417 through the rubber vibration isolator 413. The driving plate 417 is displaced virtually as much as the displacement of the piezo-actuators 412a and 412b; however, since the contact area of the action member 415 to the liquid is smaller than that of the driving plate 417, the displacement of the action member 415 is enlarged as great as the ratio of the two members. In other words, when the ratio of the liquid contact area of the action member 415 and the driving plate 417 is 1:10, the ratio of shift of the action member 415 and the driving plate 417 is represented by 10:1 (where there is a slight loss in an actual case). In this manner, in the present embodiment, since the liquid lever mechanism 414 is installed so that the displacement of the piezo-actuators 412a and 412b can be enlarged and then taken out. For this reason, the number of laminated layers of the piezo-actuators 412a and 412b can be reduced as compared with the conventional device, thereby making it possible to greatly reduce the production costs.

Moreover, as compared with a mechanical displacement enlarging mechanism using a lever, etc., the vibration control device 403 of the present embodiment, which uses the liquid lever mechanism as the displacement enlarging mechanism, has a comparatively simple structure, and hardly has any high-order vibration modes in the degree of freedom in the non-rigidity internal structure; therefore, it is more preferably used.

Next, an explanation will be given of the structure of the vibration control device 402. In the vibration control device 402, in the same manner as the above-mentioned vibration control device 403, the piezo-actuator, the rubber vibration isolator and the liquid lever mechanism are aligned in series with each other. Here, in the vibration control device 403, different from the vibration control device 402, two action members are installed in the liquid lever mechanism, and the action directions are reversed to each other by 180 with respect to the alignment direction of the piezo-actuators. More specifically, in the vibration control device 402, three piezo-actuators 432a, 432b and 432c respectively containing piezo-elements, placed in parallel with each other, a rubber vibration actuator 433 and a liquid lever mechanism 434 serving as the displacement enlarging mechanism are aligned in series with each other. Among these, the piezo-actuators 432a, 432b and 432c are housed inside the cylinder case 407, the rubber vibration isolator 433 and the liquid lever mechanism 434, except for the tip portions of the action members 435a and 435b, are housed in a lower face plate 406 that is connected to the cylinder case 407 in a manner so as to be located below it, virtually in the center thereof.

The liquid lever mechanism 434 is constituted by a liquid chamber 436 in which liquid is sealed, a driving plate 437 placed between a liquid chamber 436 and the rubber vibration isolator 433 so as to contact the liquid inside the liquid chamber 436, and two action members 435a and 435b placed on the side opposite to the driving plate 437 with respect to the liquid chamber 436 so as to contact the liquid inside the liquid chamber 436. The action members 435a and 435b are placed in a manner so as to stick out upward from the liquid chamber 436 on both of the sides of the liquid chamber 436 in the vertical direction. The liquid inside the liquid chamber 436 is sealed by an elastic seal member 440 placed along the action members 435a and 435b on the side of the action members 435a and 435b, and is also sealed by the rubber vibration isolator 433 on the driving plate 437 side.

In the same manner as the piezo-actuators 412a and 412b of the vibration control device 403, the piezo-actuators 432a, 432b and 432c, placed in parallel with each other, have their peripheral portions coated and molded with elastomer 438. The piezo-actuators 432a, 432b and 432c are slightly vibrated in the vertical direction based upon electric signals supplied from a driver, not shown, through a controlling operation by the control device. Moreover, a rigid plate 439 is placed between the rubber vibration isolator 433 and the piezo-actuators 432a, 432b and 432c so that the displacements of the piezo-actuators 432a, 432b and 432c, locally placed, are uniformly given to the liquid inside the liquid chamber 436 efficiently.

With respect to the contact area to the liquid inside the liquid chamber 436, the contact area of each of the action members 435a and 435b is smaller than that of the driving plate 437. One end of each of the action members 435a and 435b on the side opposite to the liquid chamber 436 is allowed to stick out from the lower face plate 406 toward the bottom face of the upper face plate 405. In the same manner as the vibration control device 403, the vibration control device 402 also has an arrangement in which the piezo-actuators 432a, 432b and 432c, the rubber vibration isolator 433 and the liquid lever mechanism 434 are housed in the cylinder case 7 and the lower face plate 406; therefore, it is possible to provide a small size and consequently to save space.

A laminated elastic member 442 is series-placed between the action members 435a, 435b and the upper face plate 405. The laminated elastic member 442 is a non-interference elastic member formed by alternately laminating steel plates (or resin plates or both of these) and elastomer such as cushion rubber. Rigid plates 443a and 443b are respectively placed on both of the ends of the laminated elastic member 442 in the series-alignment direction. Moreover, a rubber vibration isolator 445 and a rigid plate 443c are respectively placed between the rigid plate 443b and the lower face plate 406 in parallel with the action members 435a and 435b.

The laminated elastic member 442 and the rubber vibration isolator 445, placed between the upper face plate 405 and the lower face plate 406, are allowed to slightly contract by the weight of the upper face plate 405 so that an appropriate pressurization is applied to the vibration control device 402 by its elastic restoring force.

An explanation will be given of the operation of the vibration control device 402 having the above-mentioned arrangement. In the vibration control device 402, when vibration occurs by driving the piezo-actuators 432a, 432b and 432c, the vibration is given to the driving plate 437 through the rubber vibration isolator 433. The driving plate 437 is displaced virtually as much as the displacement of the piezo-actuators 432a, 432b and 432c; however, since the contact area of the action members 435a and 435b to the liquid is smaller than that of the driving plate 437, the displacement of each of the action members 435a and 435b is enlarged as great as the ratio of the two members. In this manner, in the present embodiment, since the liquid lever mechanism 434 is installed so that the displacement of each of the piezo-actuators 432a, 432b and 432c can be enlarged and then taken out.

In the vibration control structure 401 of the present embodiment arranged as described above, the vibration control device 402 applies a force in the vertical direction onto the upper face plate 405, and the vibration control device 403 applies a force in the horizontal direction onto the upper face plate 405. In other words, the two vibration control devices 402 and 403 are used combinedly with respect to the upper face plate 405 in such a manner that the displacement directions of the action members 435a, 435b and the action member 415 are orthogonal to each other. For this reason, it is possible to carry out vibration controlling operations on the upper face plate 405 with two-dimensional two degrees of freedom.

Moreover, in the vibration control structure 401 of the present embodiment, the respective natural frequencies of the vibration control devices 402 and 403 are reduced as compared with conventional devices, because of the laminated elastic members 422, 426 and 442 and the rubber vibration isolators 413 and 433 that are aligned in series with each other in the respective vibration control devices 402 and 403; therefore, it becomes possible to obtain a superior passive blocking performance at high frequency bands. Therefore, in accordance with the vibration control structure 401 of the present embodiment, it is possible to exert a superior active vibration blocking performance with a great displacement at low frequency bands, and also to exert a superior passive vibration blocking performance at high frequency bands, while maintaining advantages of the piezo-actuators 412a and 412b enabling high speed response with a small capacity. Thus, it is possible to achieve a vibration control system which has not been realized by a conventional vibration control device at comparatively low costs.

Here, in the vibration control device 403, even when any one of the laminated elastic members 422, 426 and the rubber vibration isolator 413 is provided, the same effects can be expected, and in the vibration control device 402, even when either of the laminated elastic member 442 and the rubber vibration isolator 433 is provided, the same effects can be expected. Moreover, in the vibration control devices 402 and 403, when an elastic member such as a laminated elastic member or a rubber vibration isolator is placed inside the liquid chamber 416 or 436, the same effects can be expected.

Furthermore, in the present embodiment, since the rubber vibration isolators 413 and 433 are placed in series with each other between the driving plates 417, 437 and the piezo-actuators, the elastic coefficient becomes greater as compared with cases in which the rubber vibration isolators 413 and 433 are placed in other positions, thereby making it possible to use a rubber vibration isolator having a small displacement as the rubber vibration isolators 413 and 433. For this reason, it becomes possible to reduce the volumes of the rubber vibration isolators 413 and 433, and consequently to provide small-size vibration control devices 402 and 403 as well as a small-size vibration control structure 401.

In the present embodiment, the liquid lever mechanism 434, which uses liquid to transmit forces, is adopted as the vibration control device 402; therefore, the place and direction to and in which a force is applied can be changed with a higher degree of freedom independent of the alignment directions of the piezo-actuators 432a, 432b and 432c. In the present embodiment, by using the above-mentioned advantage, the piezo-actuators 432a, 432b and 432c are placed in a space provided between the upper face plate 405 and the lower face plate 406, thereby making it possible to reduce the volume of the vibration control structure 401.

<28th Embodiment>

Figure 29:
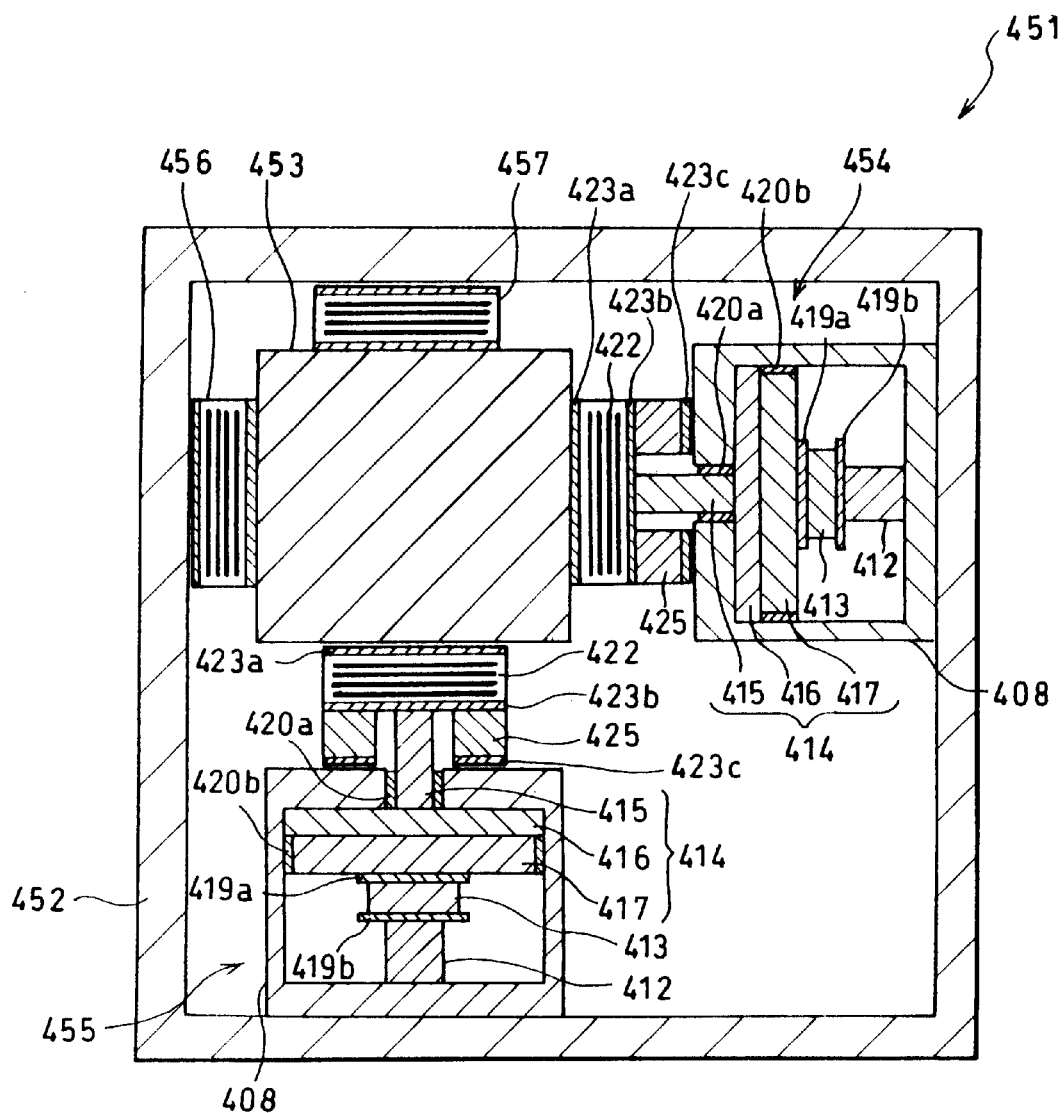
FIG. 29 is a cross-sectional view showing a vibration control device in accordance with a 28th embodiment of the present invention.

Next, referring to FIG. 29, the following description will discuss the 28th embodiment of the present invention. Here, those members that have the same functions and that are described in the 27th embodiment are indicated by the same reference numbers and the description thereof is omitted.

As illustrated in FIG. 29, in the rubber vibration control device 451 of the present embodiment, a control target member 453 having a rectangular shape in its cross-section that is placed inside a frame 452 having a rectangular shape is prepared, and to this are attached two vibration control devices 454 and 455 similar to the vibration control device 403 of the 27th embodiment shown in FIG. 28 horizontally in such a combined manner that the displacement directions of the action members are set to be orthogonal to each other. Further, laminated elastic members 456 and 457 are respectively placed between the control target member 453 and the frame 452 at areas facing the two vibration control devices 454 and 455 with the control member 453 sandwiched in between. The laminated elastic members 456 and 457 are oriented so that their lamination direction is coincident with the displacement direction of the action members of the vibration control devices 454 and 455.

Each of the vibration control devices 454 and 455 is constituted by a piezo-actuator 412 containing a piezo-element, a rubber vibration isolator 413 that is an elastic member and a liquid lever mechanism 414 that is a displacement enlarging mechanism, all of which are placed in series with each other in a cylinder case 408. The liquid lever mechanism 414 is provided with a liquid chamber 416 in which liquid is sealed, a driving plate 417 placed between the liquid chamber 416 and the rubber vibration isolator 413 so as to contact the liquid inside the liquid chamber 416 and an action member 415 placed on the side opposite to the driving plate 417 with respect to the liquid chamber 416 so as to contact the liquid inside the liquid chamber 416. Moreover, the contact area of the action member 415 to the liquid inside the liquid chamber 416 is smaller than that of the driving plate 417 thereto. One end of the action member 415 on the side opposite to the liquid chamber 416 is exposed to outside through a hole formed in the cylinder case 418.

The direction of microvibration of the piezo-actuator 412 is set to be in parallel with the direction in which the piezo-actuator 412, the rubber vibration isolator 413 and the liquid lever mechanism 414 are series-aligned. Here, thin rigid plates 419a and 419b are respectively attached to both of the ends of the rubber vibration isolator 413 in the series alignment direction. The application of the rigid members 419a and 419b on both of the sides of the rubber vibration isolator 413 makes it possible to give the displacement of the piezo-actuator 412 locally placed to the liquid inside the liquid chamber 416 efficiently.

Moreover, elastic seal members 420a and 420b are respectively placed between the side faces of the action member 415 and driving plate 417 and the cylinder case 408 so as to fill the gaps and to prevent the liquid inside the liquid chamber 416 from leaking.

A space, which is located on the side opposite to the liquid chamber 416 with respect to the driving plate 417 and in which none of the piezo-actuator 412, rubber vibration isolator 413 and rigid plates 419a and 419b are placed, is filled with air, and the air pressure is controlled by a device such as a valve or a compressor (not shown). In other words, in this space, the air pressure is adjustable so that this functions as an air spring that is placed in parallel with the piezo-actuator 412. Therefore, a load imposed on the piezo-actuator 412 is controlled by adjusting the air pressure of the space so that it becomes possible to optimally operate the piezo-actuator 412.

Moreover, in the same manner as the 27th embodiment, between the control target member 453 and the vibration control devices 454 and 455 are placed a laminated elastic member 422 series-aligned with the liquid lever mechanism 414 and a rubber vibration isolator 425 placed in parallel with the action member 415. Here, rigid plates 423a, 423b and 423c are respectively placed at the ends of these.

In this manner, in the present embodiment, controlling forces from the two action members 415 that are displaced in the two orthogonal directions with respect to the single control target member 453 are applied to the control target member 453; therefore, the vibration controlling operation is carried out with two degrees of freedom within the horizontal plane. Moreover, by further adding to this a vibration control device that is displaced in a direction orthogonal to these two directions, it becomes possible to carry out the vibration controlling operation with multiple-dimensional, multiple-degrees of freedom (for example, three dimensional, six degrees of freedom).

Moreover, in the case when the vibration control mechanism 451, arranged as shown in FIG. 29, is driven, it is more preferable from the viewpoint of accurate control to provide the following controlling operation: the control loop of the piezo-actuator is provided for displacement directions of the action members 415, that is, it is provided as an independent loop for each pair of the vibration control devices 454 and 455, and based upon vibration signals from the two independent control loops, a control signal in a common coordinate system is generated by a single control device by making coordinate conversions, and the control signal in the common coordinate system is then added to the independent operation signal in each of the action members 415 in the local coordinate system.

Moreover, in the vibration control structure 451 of the present embodiment, in the same manner as the 27th embodiment, each natural frequency of the vibration control devices 454 and 455 is reduced as compared with conventional devices because of the laminated elastic member 422 and the rubber vibration isolator 413 placed in parallel with each other in each of the vibration control devices 454 and 455; therefore, it is possible to obtain a superior passive vibration blocking performance at high frequency bands. Therefore, the vibration control structure 451 of the present embodiment is allowed to exert a superior active vibration blocking characteristic with a greater displacement in low frequency bands, and also to exert a superior passive vibration blocking characteristic in high frequency bands, while maintaining the advantage of the piezo-actuator 412 enabling a high-speed response with a small capacity, Thus, it is possible to achieve a vibration control system which has not been realized by a conventional vibration control device at comparatively low costs. Here, in the vibration control devices 454, 455, even when either of the laminated elastic member 422 and the rubber vibration isolator 413 is provided, the same effects can be expected. Further, in the vibration control device 454, 455, even when an elastic member such as a laminated elastic member or a rubber vibration isolator is placed inside the liquid chamber 416, the same effects can be expected.

Moreover, in the present embodiment, since the rubber vibration isolator 413 is placed between the driving plate 417 and the piezo-actuator 412 in parallel with the two members, the elastic coefficient becomes greater as compared with cases in which the rubber vibration isolator 413 is placed in another position, thereby making it possible to use a rubber vibration isolator having a smaller displacement as the rubber vibration isolator 413. For this reason, it becomes possible to reduce the volumes of the rubber vibration isolator 413, and consequently to provide small-size vibration control devices 454 and 455 as well as a small-size vibration control structure 451.

While these has been described what are at present considered to be preferred embodiments of the invention, it will be understood that various modifications may be made thereto, and it is intended that the appended claims cover all such modifications as fall within the true sprit and scope of the invention.

For example, different from the arrangement of the twelfth embodiment, the displacement direction of the action member is not necessarily the same as the displacement direction of a control target member, and any known action direction conversion mechanism may be used so that the displacement direction of the action member is changed so as to make 90° (or any desired angle) with respect to the displacement direction of the control target member. Moreover, the liquid chamber pressure control mechanism, as explained in the third embodiment, may be used in another embodiment such as the fourteenth or fifteenth embodiment. Moreover the lever mechanism constituted by a plurality of portions as described in the twelfth embodiment may be used in another embodiment such as the fourteenth or fifteenth embodiment.

Moreover, in the above-mentioned 27th and 28th embodiments, two vibration control devices are combined and used with respect to one control target member; however, not less than three vibration control devices may be combined and used with respect to one control target member, thereby providing a controlling operation with high-dimensional, high degree of freedom. Furthermore, with respect to not less than two control target members, a plurality of vibration control devices may be used. With respect to the 27th and 28th embodiments, the vibration control devices, as explained in the second through 26th embodiments, may be used.

What is claimed is:

1. A vibration control device comprising:
   a displacement enlarging mechanism having first and second movable sections that are arranged so that a displacement inputted to the first movable section is enlarged and taken out from the second movable section;
   a solid-state actuator that is placed on a side opposite to the second movable section with respect to the first movable section, and is allowed to shift in a direction so as to move the first movable section of the displacement enlarging mechanism based upon an electric signal supplied thereto; and
   an inside elastic member that is placed between the second movable section and the solid-state actuator in series therewith.

2. The vibration control device according to claim 1, wherein the displacement enlarging mechanism is a liquid displacement enlarging mechanism having a liquid chamber in which liquid is sealed, the first movable section is allowed to contact the liquid inside the liquid chamber, and the second movable section is allowed to contact the liquid inside the liquid chamber with a contact area smaller than a contact area of the first movable section.

3. The vibration control device according to claim 2, further comprising:
   a mechanism for adjusting a pressure inside the liquid chamber.

4. The vibration control device according to claim 2, wherein the first movable section has a peripheral portion that is sealed by the inside elastic member.

5. The vibration control device according to claim 2, wherein the inside elastic member is placed inside the liquid chamber.

6. The vibration control device according to claim 1, wherein the inside elastic member is placed between the first movable section and the solid-state actuator.

7. The vibration control device according to claim 6, wherein rigid members are attached to both of the ends of the inside elastic member in a displacement direction thereof.

8. The vibration control device according to claim 1, wherein the displacement enlarging mechanism, the solid-state actuator and the inside elastic member are assembled in one case.

9. The vibration control device according to claim 1, which is allowed to control a load to be applied to the solid-state actuator.

10. The vibration control device according to claim 1, further comprising:
    an inside parallel elastic member placed in parallel with the solid-state actuator.

11. The vibration control device according to claim 1, further comprising:
    a coat member for coating the solid-state actuator.

12. The vibration control device according to claim 1, wherein the first movable section and second movable section respectively have peripheral edges that are sealed with elastic seal members.

13. The vibration control device according to claim 1, further comprising:
    a cushion elastic member that is placed on the side opposite to the first movable section with respect to the second movable section.

14. The vibration control device according to claim 13, wherein the cushion elastic member is placed in series with as well as in parallel with the second movable section.

15. The vibration control device according to claim 13, wherein the cushion elastic member has a portion formed by alternately laminating at least either of steel plates and resin plates, and elastomer.

16. The vibration control device according to claim 1, wherein a plurality of the solid-state actuators are aligned in parallel with each other.

17. The vibration control device according to claim 1, wherein a plurality of the second movable sections are aligned in parallel with each other with respect to the single displacement enlarging mechanism.

18. The vibration control device according to claim 1, wherein the first movable sections and the solid-actuators are placed on both of the ends of the displacement enlarging mechanism in a manner so as to face each other.

19. The vibration control device according to claim 1, wherein the solid-state actuator includes a piezo-element.

20. The vibration control device according to claim 1, wherein the solid-state actuator includes a super-magnetostrictive element.

21. A vibration control device comprising:
    a displacement enlarging mechanism including:
      a liquid chamber in which liquid is sealed and a number of small particles whose volume is elastically variable are dispersed;
      a first movable section that is allowed to contact the liquid inside the liquid chamber; and
      a second movable section that is allowed to contact the liquid inside the liquid chamber with a contact area smaller than that of the first movable section; and
    a solid-state actuator which is placed on the side opposite to the second movable section with respect to the first movable section and which is displaced in a direction along which the first movable section of the displacement enlarging mechanism is shifted, based upon an electric signal supplied thereto.

22. The vibration control device according to claim 21, further comprising:
    a mechanism for adjusting a pressure inside the liquid chamber.

23. A vibration control device comprising:
    a displacement enlarging mechanism including:
      a gas chamber having a gas sealed therein, whose volume is elastically variable;

a first movable section that is allowed to contact the gas inside the gas chamber; and a second movable section that is allowed to contact the gas inside the liquid chamber with a contact area smaller than that of the first movable section; and a solid-state actuator which is placed on the side opposite to the second movable section with respect to the first movable section and which is displaced in a direction along which the first movable section of the displacement enlarging mechanism is shifted, based upon an electric signal supplied thereto.

24. The vibration control device according to claim 23, further comprising:

a mechanism for adjusting a pressure inside the liquid chamber.

* * * * *